United States Patent
Sugiyama

(10) Patent No.: US 11,007,902 B2
(45) Date of Patent: May 18, 2021

(54) SEAT WITH DETECTOR

(71) Applicant: TS TECH CO., LTD., Asaka (JP)

(72) Inventor: Shinji Sugiyama, Tochigi (JP)

(73) Assignee: TS Tech Co., Ltd., Saitama (JP)

(*) Notice: Subject to any disclaimer, the term of this patent is extended or adjusted under 35 U.S.C. 154(b) by 0 days.

(21) Appl. No.: 16/658,801

(22) Filed: Oct. 21, 2019

(65) Prior Publication Data
US 2020/0047640 A1    Feb. 13, 2020

Related U.S. Application Data

(63) Continuation of application No. 15/561,777, filed as application No. PCT/JP2016/059637 on Mar. 25, 2016, now Pat. No. 10,449,874.

(30) Foreign Application Priority Data

Mar. 27, 2015 (JP) ................... 2015-067209
Mar. 27, 2015 (JP) ................... 2015-067210
Mar. 27, 2015 (JP) ................... 2015-067211

(51) Int. Cl.
*B60N 2/00*  (2006.01)
*B60N 2/90*  (2018.01)
(Continued)

(52) U.S. Cl.
CPC .......... *B60N 2/002* (2013.01); *B60N 2/58* (2013.01); *B60N 2/5816* (2013.01); *B60N 2/70* (2013.01);
(Continued)

(58) Field of Classification Search
CPC . B60N 2/002; B60N 2/90; B60N 2/70; B60N 2/58; B60N 2/5816; B60N 2002/0268
See application file for complete search history.

(56) References Cited

U.S. PATENT DOCUMENTS 6,953,224 B2   10/2005   Seto et al.
8,701,816 B2    4/2014   Saitoh
(Continued)

FOREIGN PATENT DOCUMENTS

JP   2007-301175 A   11/2007
JP   2008-051592 A    3/2008
(Continued)

OTHER PUBLICATIONS

Office Action issued in related application JP 2019-086790, dated Jun. 9, 2020, with machine generated English language translation, 8 pages.

(Continued)

*Primary Examiner* — Drew J Brown
(74) *Attorney, Agent, or Firm* — Faegre Drinker Biddle & Reath LLP

(57) ABSTRACT

A seat is configured to suitably restrain a warping of a connecting portion in a signal transmission path, when the connecting portion is disposed inside a through hole provided in a pad member of the seat. The seat includes: a pressure sensor that detects a seating pressure of a seat occupant; a leading wire of the transmission path that extends from the pressure sensor; a cable of the transmission path that extends from an electronic control unit for a signal output from the pressure sensor; a warp restraining member that restrains a warping of a connecting portion of the leading wire and the cable; and a through hole formed in a pad member of the seat, from one end to another end in the thickness direction of the pad member. The warp restraining member is inserted into the through hole to thereby pass the transmission path through the through hole.

18 Claims, 17 Drawing Sheets

(51) Int. Cl.
*B60N 2/58* (2006.01)
*B60N 2/70* (2006.01)
*B60N 2/02* (2006.01)

(52) U.S. Cl.
CPC ........ *B60N 2/90* (2018.02); *B60N 2002/0268* (2013.01)

(56) References Cited

U.S. PATENT DOCUMENTS

| | | | |
|---|---|---|---|
| 9,315,132 B2 | 4/2016 | Mabashi et al. | |
| 10,765,334 B2 * | 9/2020 | Sugiyama | A61B 5/0245 |
| 2002/0093236 A1 | 7/2002 | Inoue | |
| 2005/0016786 A1 * | 1/2005 | Mack | B60R 21/01532 |
| | | | 180/271 |
| 2005/0230946 A1 * | 10/2005 | Takashima | A61B 5/6887 |
| | | | 280/735 |
| 2006/0278513 A1 | 12/2006 | Kawahira et al. | |
| 2008/0046152 A1 | 2/2008 | Ohtake et al. | |
| 2011/0224875 A1 * | 9/2011 | Cuddihy | B60W 10/18 |
| | | | 701/42 |
| 2012/0031685 A1 | 2/2012 | Saitoh | |
| 2013/0231579 A1 * | 9/2013 | Shigeto | A61B 5/4809 |
| | | | 600/529 |
| 2013/0261477 A1 * | 10/2013 | Fuwamoto | A61B 5/6893 |
| | | | 600/515 |
| 2014/0039330 A1 * | 2/2014 | Seo | A61B 5/02 |
| | | | 600/509 |
| 2014/0275834 A1 * | 9/2014 | Bennett | A61B 5/6893 |
| | | | 600/301 |
| 2015/0313475 A1 * | 11/2015 | Benson | A61B 5/0205 |
| | | | 297/217.3 |
| 2015/0321590 A1 | 11/2015 | Mizoi et al. | |
| 2016/0249843 A1 * | 9/2016 | Sugiyama | A61B 5/02455 |
| | | | 600/521 |
| 2016/0317047 A1 | 11/2016 | Sugiyama | |
| 2018/0118071 A1 | 5/2018 | Sugiyama et al. | |
| 2018/0319365 A1 | 11/2018 | Derieux et al. | |
| 2019/0031065 A1 | 1/2019 | Kamei et al. | |
| 2019/0054841 A1 * | 2/2019 | Cech | G08B 21/22 |

FOREIGN PATENT DOCUMENTS

| | | |
|---|---|---|
| JP | 2009-106673 A | 5/2009 |
| JP | 2009-172204 A | 8/2009 |
| JP | 2012-020002 A | 2/2012 |
| JP | 2012-051548 A | 3/2012 |
| JP | 2012-121364 A | 6/2012 |
| JP | 2013-095373 A | 5/2013 |
| JP | 2015-003580 A | 1/2015 |
| JP | 2015-123359 A | 7/2015 |
| WO | 2013/080369 A1 | 6/2013 |
| WO | 2014/185532 A1 | 11/2014 |

OTHER PUBLICATIONS

Office Action issued in related application JP 2015-067209, dated Aug. 28, 2018, with machine generated English language translation, 6 pages.
Office Action issued in related application JP 2015-067211, dated Aug. 28, 2018, with machine generated English language translation, 4 pages.

* cited by examiner

SEAT WITH DETECTOR

CROSS REFERENCE TO RELATED APPLICATIONS

This application is a continuation application of U.S. patent application Ser. No. 15/561,777, filed Sep. 26, 2017, now U.S. Pat. No. 10,449,874, which is the National Stage Entry application of PCT Application No. PCT/JP2016/059637, filed Mar. 25, 2016, which claims the priority benefit of Japanese Patent Application Nos. JP 2015-067209, JP 2015-067210, and JP 2015-067211, all filed Mar. 27, 2015, the contents being incorporated herein by reference.

BACKGROUND

The present disclosure relates to a seat with a detector, specifically, a seat comprising a detector which detects a target value that changes when a seat occupant is seated on a seat.

Seats comprising a detector such as a sensor have already been known. Examples of known seats include those comprising a pressure sensor which detects a pressure applied to each portion of a seat face (seating pressure), when a seat occupant is seated on the seat. In such seats, a pressure sensor is generally disposed directly under a seating face. On the other hand, a device (signal receiving unit) which receives a signal which is output when a pressure sensor has detected a seating pressure is disposed in a position away from the pressure sensor. For example, a case is supposed where the signal receiving unit is disposed in the back face side (opposite side of the seating face) of a pad member that forms the seating face. In such a case, for such a circumstance that a transmission path for signals output from the pressure sensor is shortened as much as possible, it is possible to employ a structure in which a through hole is made in the pad member, and a transmission path is passed through the through hole, as described in Japanese Patent Publication JP 2013-95373.

In this connection, the transmission path is separated into a portion extending from the pressure sensor and a portion extending from the signal receiving unit, in some cases. In such cases, there should be a connecting portion which connects the two portions constituting the transmission path. It is supposed that the connecting portion is disposed inside the through hole described above, for a purpose of avoiding being damaged from interfering with a peripheral member, or the like. However, even if the connecting portion is disposed inside the through hole, when a relatively large load is applied around the through hole, there is a risk that the load may be transmitted to the connecting portion to warp and damage the connecting portion.

SUMMARY

Thus, the present disclosure has been made in consideration of the problem described above, and various embodiments described herein provide a seat with a detector capable of appropriately restraining a warping of a connecting portion in a transmission path for a signal that is output from a detector, when the connecting portion is disposed inside a through hole provided in a pad member.

According to an embodiment, a seat with a detector includes: a detector which detects a target value that changes when a seat occupant is seated on a seat; a first transmission path forming portion that forms a portion extended from the detector, in the transmission path for a signal which is output when the detector has detected the target value; a second transmission path forming portion that forms a portion extended from the signal receiving unit which receives the signal, in the transmission path; a warp restraining member which restrains a warping of a connecting portion of a portion formed with the first transmission path forming portion and a portion formed with the second transmission path forming portion in the transmission path; and a through hole formed in a pad member provided in the seat over from one end to the other end of the pad member in a thickness direction of the pad member; and by inserting the warp restraining member into the through hole to pass the transmission path through inside the through hole.

The seat with a detector configured as above restrains a warping of a connecting portion of a portion extended from a detector and a portion extended from a signal receiving unit in the transmission path, with a warp restraining member. The warp restraining member is inserted in a through hole provided in a pad member. In this manner, the connecting portion is disposed inside the through hole, in a state restrained from warping by the warp restraining member.

In the seat with a detector, it is desirable that the connecting portion comprise a fastening member that fasten the end portions of both of the first transmission path forming portion and the second transmission path forming portion, and the warp restraining member restrain a warping of the connecting portion by fixing the fastening member and the both end portions on the outer surface of the warp restraining member. In an embodiment of the above-described structure, a warping of the connecting portion is restrained by fixing the fastening member and the end portion of each of the transmission path forming portions on the outer surface of the warp restraining member. Such a structure makes it possible to restrain a warping of the connecting portion with a simpler structure.

In the seat with a detector described above, it is desirable that the warp restraining member be configured with a resin material, and have an outer surface elliptically curved. In an embodiment of the structure described above, the warp restraining member is formed with a resin molding which has an outer surface elliptically curved. In such a structure, when the fastening member and the end portion of each of the transmission path forming portions are fixed, it is possible to inhibit occurrence of damage, when the outer surface of the warp restraining member abuts the fastening member or the end portion of each of the transmission path forming portions, since the outer surface of the warp restraining member has no angular portion.

In the seat with a detector described above, it is desirable that: the detectors be provided in plural numbers; the first transmission path forming portion, the second transmission path forming portion, and the fastening member be provided to each of the detectors; a holder film be further provided, to be attached to each of the first transmission path forming portion, the second transmission path forming portion, and the fastening member of each of the detectors, and holding each of the same; and the warp restraining member restrains a warping of the connecting portion in such a manner that a portion of the holder film which is attached to the fastening member and the both end portions is fixed onto the outer surface of the warp restraining member, in a state wound around the warp restraining member along the outer surface. In an embodiment of the above-described structure, the fastening member and end portion of each of the transmission path forming portions are fixed onto the outer surface of the warp restraining member, in such a manner that a portion of the holder film, to which the fastening member and the end portion of each of the transmission path forming portions are attached is wound around the warp restraining member. By such a structure, it becomes easy to fix the fastening member and the end portion of each of the transmission path forming portions onto the outer surface of the warp restraining member.

In the seat with a detector described above, it is desirable that: the holder film comprise a first film portion and a second film portion adjacent to each other having different widths, the first film portion with a larger width being a portion attached to the fastening member and the both of end portions, wound around the warp restraining member along the outer surface, and the second film portion with a narrower width being attached to the first transmission path forming portion of each of the detectors; the warp restraining member comprise, in an end portion thereof, a flange portion having a part notched; and the second film portion come inside a recess portion which is formed by notching a part of the flange portion, when the first film portion is in a state wound around the warp restraining member. In an embodiment of the structure described above, in the holder film, when the first film portion with a larger width is wound around the warp restraining member, the second film portion with a narrower width comes into the recess portion of the flange portion. In such a structure, it becomes possible to inhibit a positional deviation of the first film portion, since the second film portion comes into the recess portion to be locked on the inner wall of the recess portion, when the first film portion is wound around the warp restraining member. As a result, it becomes possible to favorably wind the first film portion around the warp restraining member.

In the seat with a detector described above, it is also desirable that the warp restraining member be inserted into the through hole along a partial region of the inner wall of the through hole, and the partial region of the inner wall of the through hole form a gradient face. In an embodiment of the structure described above, the region in the inner wall of the through hole, along which the warp restraining member abut, forms a gradient face. This facilitates accommodating the warp restraining member in the through hole, and allows inhibiting a poor functioning which may occur when the warp restraining member protrudes from the through hole, such as a feeling of foreign object given at seating on the seat.

In the seat with a detector described above, it is also desirable that the partial region of the inner wall face of the through hole form a gradient face declined such that out of the both ends of the partial region in the thickness direction, an end nearer to the detector is positioned forward relative to the end farther away from the detector. In an embodiment of the structure described above, in the partial region of the inner wall face of the through hole forming a gradient face, the end nearer to the detector of the partial region is positioned forward relative to the end farther away from the detector. By such a structure, the warp restraining member, the fastening member and the end portion of each of the transmission path forming portions inserted into the through hole are kept farther away from the rear end portion of the buttocks of a seat occupant, when the seat occupant is seated on the seat. As a result, it becomes possible to inhibit giving a seat occupant a feeling of foreign object when seated on a seat, more effectively.

In the seat with a detector described above, it is desirable that: the connecting portion comprise the fastening member to which the end portions of the first transmission path forming portion and the second transmission path forming portion are fastened; the detector be provided in plural numbers to positions different from each other; the plural number of detectors comprise a first detector and a second detector which are arranged to be spaced from each other in a seat width direction of the seat; the first transmission path forming portion, the second transmission path forming portion, and the fastening member be provided to each of the detectors; a holder film be further provided, to be attached to each of the first transmission path forming portion, the second transmission path forming portion, and the fastening member of each of the detectors, and holding each of the same; a portion of the holder film, sandwiched between the first detector and the second detector in the seat width direction have a first extending portion in the outer side in the seat width direction which extends along the seat width direction, and a second extending portion in the inner side in the seat width direction which extends along the seat width direction at a rear position relative to the first extending portion; and the through hole be formed to be positioned forward relative to the second extending portion in the pad member. In an embodiment of the above structure, the portion of the holder film, sandwiched between the first detector and the second detector in the seat width direction has a first extending portion in the outer side in the seat width direction, and a second extending portion in the inner side in the seat width direction in a rear position relative to the first extending portion. In other words, the second extending portion, positioned in the inner side in the seat width direction in the portion of the holder film sandwiched between the first detector and the second detector, is offset rearward of the first extending portion positioned in the outer side in the seat width direction. Then, in a space secured by offsetting the second extending portion rearward, a through hole is formed. In other words, it is possible to appropriately secure a space for forming a through hole, by offsetting the second extending portion.

In the seat with a detector described above, it is also desirable that the through hole is formed such that the rear end of the through hole is positioned rearward of the fore-end of the first extending portion, in a seat front to back direction. In an embodiment of the structure described above, the through hole is formed such that the rear end of the through hole is positioned rearward relative to the fore-end of the first extending portion in the seat front to back direction. By such a structure, it becomes possible to more effectively utilize the space secured by offsetting the second extending portion rearward.

According to an embodiment of the present disclosure, it becomes possible that the connecting portion of the portion extended from the detector and the portion extended from the signal receiving unit in the transmission path for a signal output from the detector is disposed inside the through hole provided in the pad member, and that a warping of the connecting portion is restrained by the warp restraining member. According to an embodiment of the present disclosure, it also becomes possible to restrain a warping of the connecting portion with a simpler structure. According to an embodiment of the present disclosure, it also becomes possible to inhibit occurrence of damage in the fastening member or end portion of each of the transmission path forming portions, when the fastening member and the end portion of each of the transmission path forming portions are fixed onto the outer surface of the warp restraining member. According to an embodiment of the present disclosure, it becomes easy to fix the fastening member and end portion of each of the transmission path forming portions onto the outer surface of the warp restraining member. According to an embodiment of the present disclosure, it also becomes possible to favorably wind the first portion around the warp restraining member, with inhibiting positional deviation of the first portion. According to an embodiment of the present disclosure, it also becomes easy to accommodate the warp restraining member in the through hole, and it becomes possible to inhibit a poor functioning which may occur when the warp restraining member protrudes from the through hole, such as a feeling of foreign object given at the time of seating on the seat. According to an embodiment of the present disclosure, it also becomes possible to more effectively inhibit giving a seat occupant a feeling of foreign object, at the time of seating on the seat. According to an embodiment of the present disclosure, it also becomes possible to appropriately secure a space for forming a through hole, by offsetting the second extending portion positioned in the inner side in the width direction rearward, in the portion of the holder film sandwiched between the first detector and the second detector. According to an embodiment of the present disclosure, it also becomes possible to more effectively utilize the space secured by offsetting the second extending portion rearward.

BRIEF DESCRIPTION OF DRAWINGS

Various embodiments of the invention are illustrated in the drawings in which.

DETAILED DESCRIPTION

Seat with Detector According to First Embodiment of Present Disclosure

In the description below, a seat with a detector according to a first embodiment of the present disclosure (the present embodiment) is explained. Hereinbelow, an explanation is given with a vehicle seat mounted in a vehicle described as an example seat. In the following explanation, "front to back direction" corresponds to the front to back direction of the seat, which refers to the front to back direction when viewed from a seat occupant seated on a vehicle seat, specifically, the front to back direction (in other words, the traveling direction) of the vehicle. "Width direction" corresponds to the width direction of the seat, which refers to the right to left direction when viewed from a seat occupant seated on a vehicle seat. The embodiments explained below are an example for facilitating understanding of the present disclosure, and do not limit the present disclosure. In other words, a shape, a dimension, an arrangement, or the like of a member explained below may be changed or improved without deviating from the gist of the present disclosure, and the present disclosure naturally comprise equivalents thereof.

Figure 1:
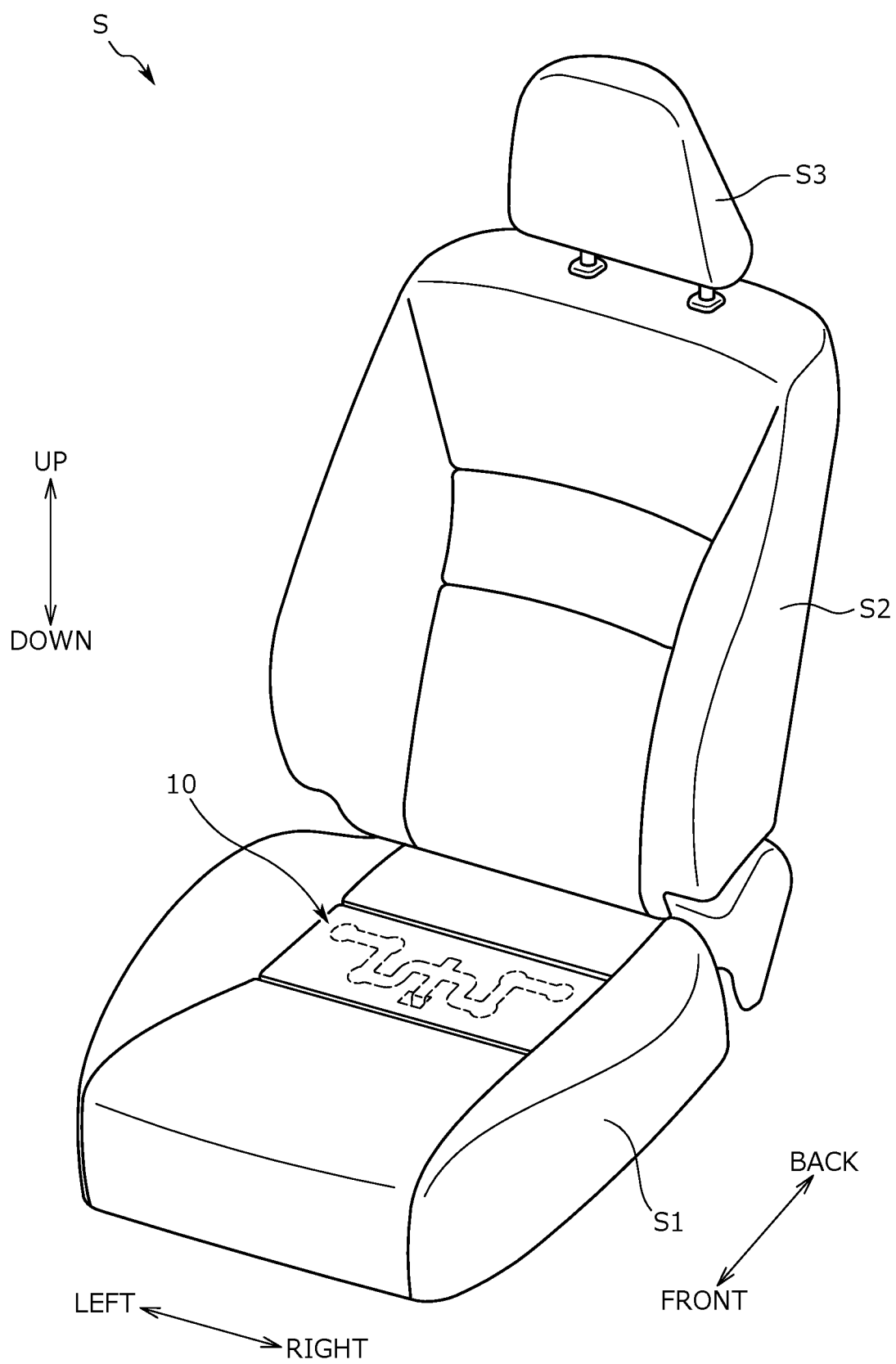
FIG. 1 is a view showing an overall perspective of a seat with a detector according to a first embodiment.

In general, a basic structure of the vehicle seat according to the present embodiment (hereinbelow, present seat S) is the same as a structure of an ordinary vehicle seat. In other words, as shown in FIG. 1, the present seat S comprises a seat cushion S1 which supports buttocks of a seat occupant from below, a seat back S2 which supports back of a seat occupant from behind, and a headrest S3 which supports head of a seat occupant. FIG. 1 is a view showing an overall perspective of the present seat S.

The seat cushion S1 and the seat back S2 are configured by setting a pad member comprising urethane or the like in a seat frame which is not illustrated, and then covering the pad member with a covering material. In this connection, in the pad member of each of the seat cushion S1 and the seat back S2, a groove for hanging the covering material (hanging groove) is formed long along a predetermined direction.

The present seat S also comprises a pressure sensor 1 as a detector. More particularly, the present seat S comprises multiple (e.g., a plural number of) pressure sensors 1, and the plural number of pressure sensors 1 are provided directly below the seating face of the seat cushion 1, in a unitized state. Each of the pressure sensors 1 detects, at individual location, a pressure (a seating pressure) applied to a seating face when a seat occupant is seated on the present seat S. Here, the seating pressure refers to a value which periodically changes according to biological activity, specifically, respiration of a seat occupant, which is a target value to be detected by the pressure sensor 1.

The pressure sensor 1 comprises a publicly known pressure sensor, for example, a piezoelectric sensor-type pressure sensor, a semiconductor-piezoresistive-type pressure sensor, a strain gauge-type pressure sensor, a capacitance-type pressure sensor, or a silicon resonant-type pressure sensor, or the like.

In the present embodiment, the unit comprising the plural number of pressure sensors 1 (hereinbelow, sensor unit 10) is provided in a rear side portion of the seat cushion S1, as shown in FIG. 1 with a broken line. Each of the pressure sensors 1 in the sensor unit 10 is disposed in a position sandwiched between the pad member constituting the seat cushion 1 and the covering material covering the pad member, to detect a seating pressure in a high accuracy. However, there is no limitation in sensor location, so long as it is a position where it is possible to detect a seating pressure with suitable accuracy. For example, the pressure sensor 1 may be disposed above the seating face of the seat cushion S1.

Figure 2:
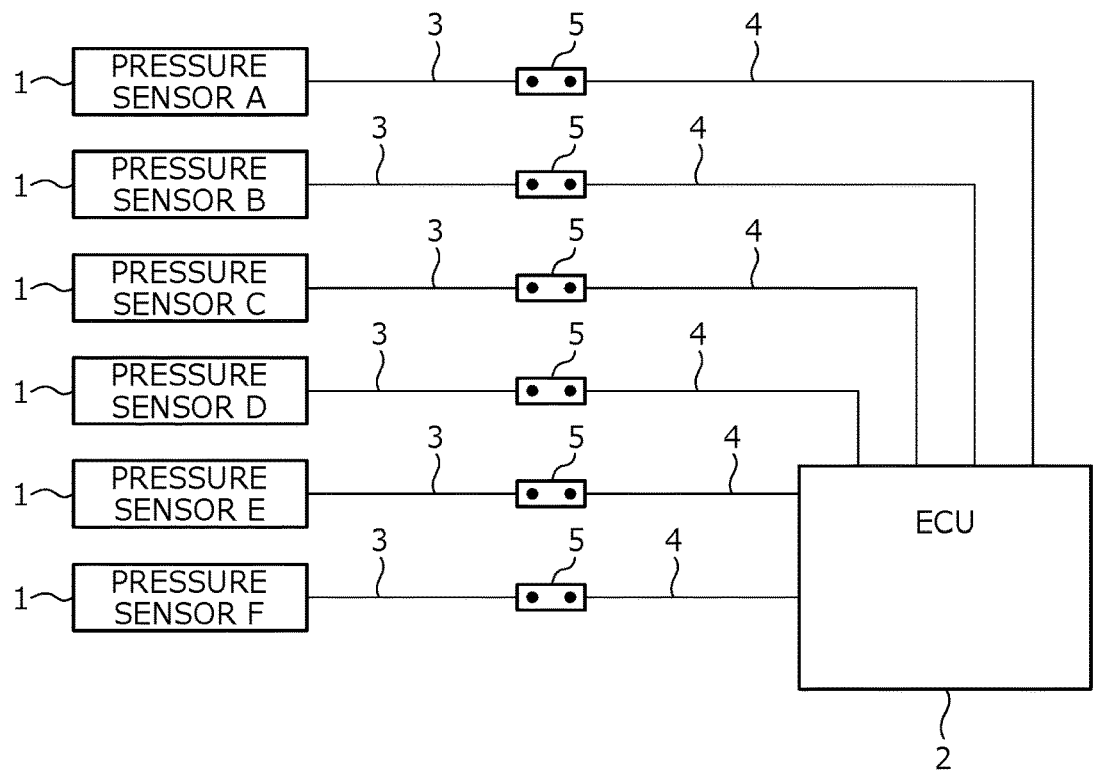
FIG. 2 is a conceptual view showing a transmission path for an output-signal from a detector, according to an embodiment.

Upon detecting a seating pressure, the pressure sensor 1 outputs a signal according to the detected result. Such an output-signal is received by an ECU (Electronic Control Unit) 2, as shown in FIG. 2. In other words, in the present embodiment, an ECU 2 functions as a signal receiving unit which receives an output-signal from each of the pressure sensors 1. FIG. 2 is a conceptual view showing the transmission paths for output-signals from the pressure sensors 1.

Further, the ECU 2 according to the present embodiment is configured to function as a signal processing unit, subjecting a received signal to a signal processing such as a noise removal process, an A/D conversion process, etc. Furthermore, the ECU 2 according to the present embodiment is configured to function as a numerical processing unit, carrying out a numerical processing to determine a biological condition of a seat occupant, on the basis of the processed signal. The "biological condition of a seat occupant" refers to a condition relating to normality/abnormality of an action or a function of each body portion (including an internal organ or a nerve) of a seat occupant, such as wakefulness or alertness condition, mental tranquility condition, heavy inebriation condition, etc. In an embodiment, the ECU 2 according to the present embodiment has a function of determining wakefulness condition of a seat occupant.

In an embodiment, a hardware configuration of the ECU 2 includes an input port and a controller. The controller receives an output-signal from the pressure sensor 1 which has been input to the input port to a suitable signal processing unit, and by using the signal after being processed (e.g., digital signal processing), carries out a numerical processing. As a result of such a numerical processing, a wakefulness condition of a seat occupant at the point of time is determined. In this connection, as a method for determining a wakefulness condition of a seat occupant on the basis of a detected result (namely, a detected value of a seating pressure), publicly known determination methods are available. For example, it is possible to determine a wakefulness condition of a seat occupant, by distinguishing a wave form which shows a periodic change of a seating pressure from a detected result from the pressure sensor 1, and determining a wakefulness condition of a seat occupant on the basis of a length of a cycle (plainly, space between peaks) of the wave.

The ECU 2 according to the present embodiment is disposed in a lower position of the seat cushion S1. In other words, in the present embodiment, the ECU 2 is provided to be disposed in the side opposite to the pressure sensor 1 across the pad member P of the seat cushion S1. In addition, the ECU 2 according to the present embodiment is disposed rearward of any of the plural pressure sensors 1.

Figure 3:
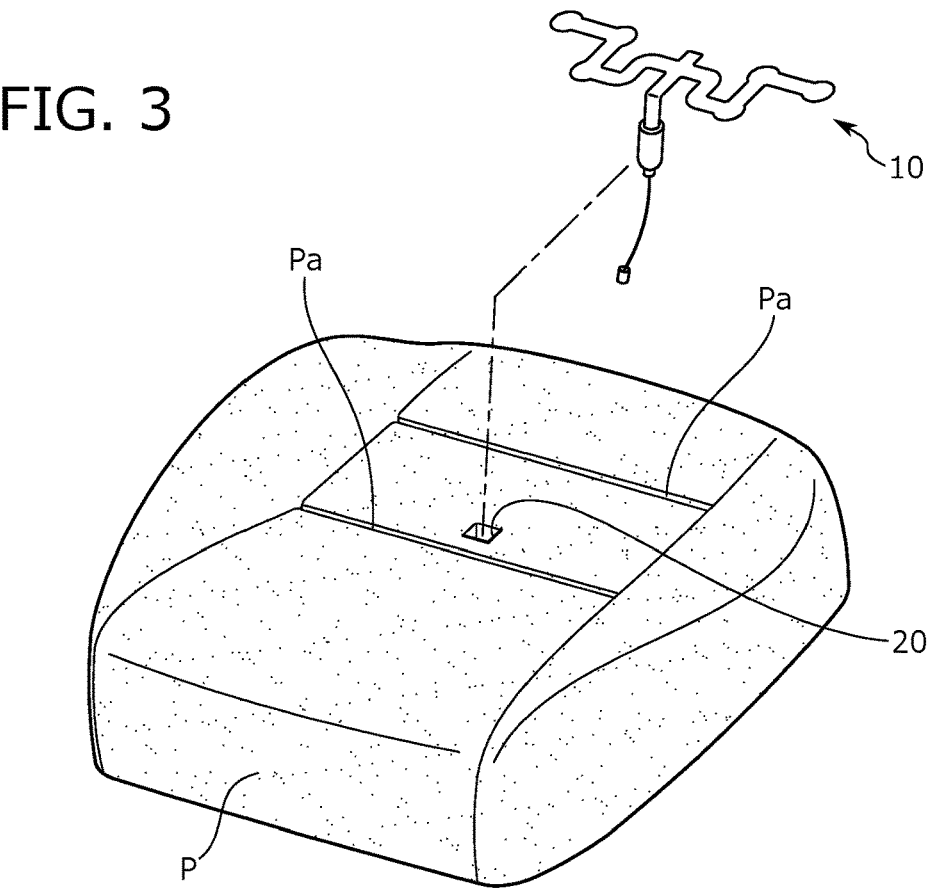
FIG. 3 is a view showing a manner of attaching a detector to a pad member, according to an embodiment.

As described above, in the present embodiment, the ECU 2 which receives output-signals from the pressure sensor 1 is disposed in the side opposite to the pressure sensor 1, across the pad member P. In the present embodiment, a through hole 20 is formed in the pad member 20 as shown in FIG. 3, so that a transmission path for output-signals from the pressure sensor 1 is laid to the ECU 2 in such a structure. Inside this through hole 20, a portion of the sensor unit 10, which forms the transmission paths for signals (the transmission path forming portion) is passed through, so that the transmission paths pass inside the through hole 20, and ends of the transmission paths are connected to the ECU 2. FIG. 3 is a view showing a manner of attaching the sensor unit 10 to the pad member P of the seat cushion S1.

Figure 4:
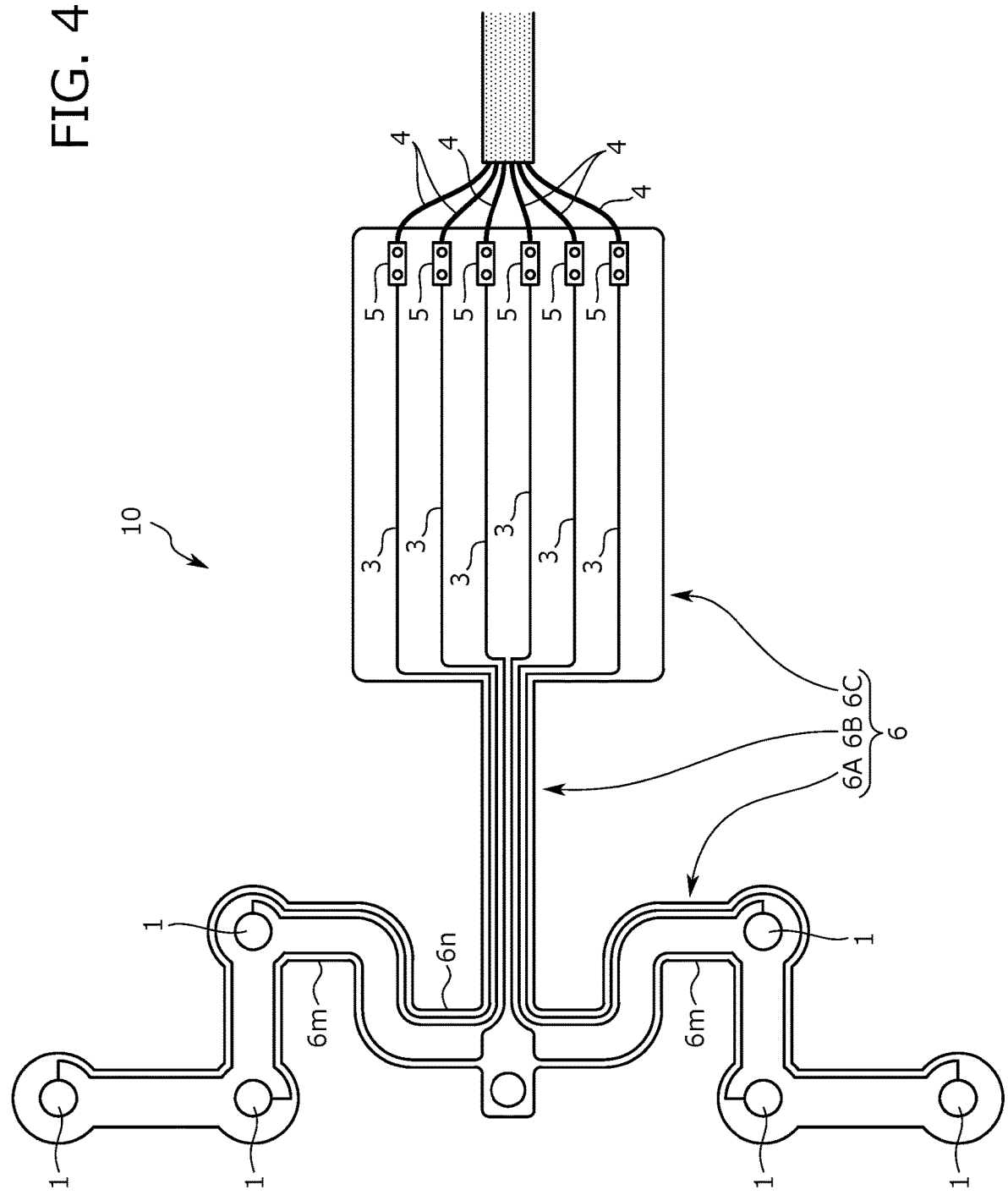
FIG. 4 is a plan view showing detectors, transmission path forming portions, fastening members, and a holder film, according to an embodiment.

Hereinbelow, the sensor unit 10 and a structure configured to attach the sensor unit 10 to the pad member P are explained in detail. The sensor unit 10 is mainly comprised of the pressure sensors 1, the leading wires 3 as the first transmission path forming portions, the cables 4 as the second transmission path forming portions, terminal linking members 5 as the fastening members, and the holder film 6, as shown in FIG. 4. FIG. 4 is a plan view showing the sensor unit 10 in a developed state.

The pressure sensor 1 is provided to the sensor unit 10 in plural numbers, as set forth above. In the present embodiment, six pieces are provided as shown in FIG. 4. However, the number of the pressure sensor 1 is not limited to six, but may be set to arbitrary number of two or more. In the explanation below, each of the six pressure sensors 1 is referred to as pressure sensor A, pressure sensor B, pressure sensor C, pressure sensor D, pressure sensor E, and pressure sensor F, when distinguished from each other.

Figure 5:
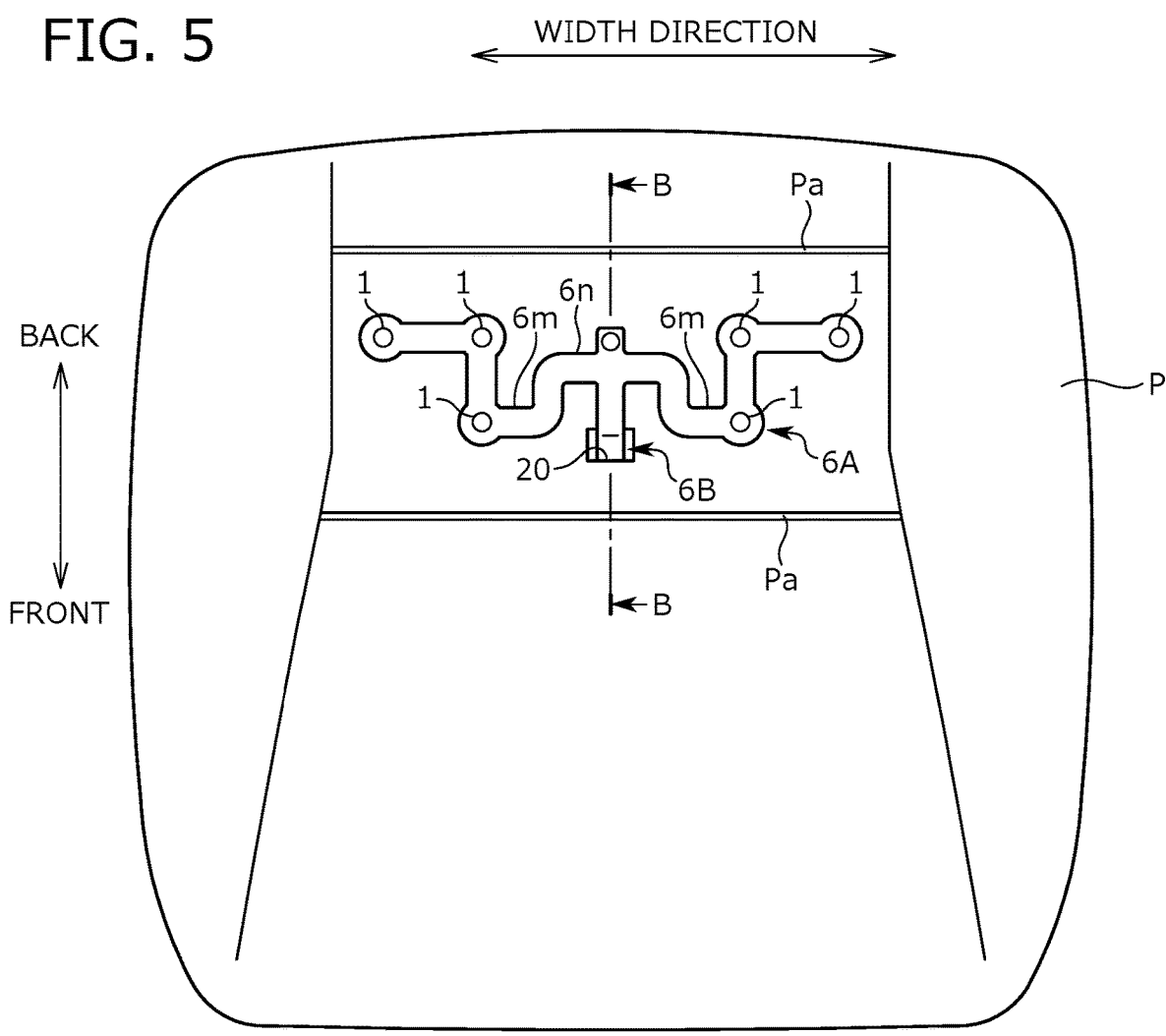
FIG. 5 is a plan view showing locations of detectors, according to an embodiment.

In a state that the sensor unit 10 is attached to the pad member P, the six pressure sensors 1 are disposed such that locations of each of the pressure sensors 1 have coordinates different from each other in the XY coordinate space, as shown in FIG. 5. Here, the XY coordinate space refers to a two-dimensional coordinate space defined when two of the width direction and the front to back direction are set as axial directions of the coordinate axes. In this connection, coordinates of the origin position in the XY coordinate space is explained such that the X coordinate is the center position of the seating face in the width direction, and the Y coordinate is a position somewhat rear to the center position in the front to back direction of the seating face. FIG. 5 is a plan view showing locations of each of the pressure sensors 1. In FIG. 5, some of the parts other than the pressure sensors 1 (for example, the leading wires 3) are omitted for easy understanding of the locations of the pressure sensors 1.

As for locations of the pressure sensors 1, it is explained more particularly such that the six pressure sensors 1 are disposed separately in front and back as shown in FIG. 5. Specifically, four pressure sensors 1 in the rear-side, and two pressure sensors 1 in the fore-side are each disposed in a line along the width direction. The six pressure sensors 1 are disposed bilaterally symmetrically across the Y-axis (namely, the center position in the width direction of the seating face). In an embodiment, coordinates of locations of each of the pressure sensors 1 are as follows:

(Location of pressure sensor A)=(Xa, 0), wherein Xa is any real number larger than 0,
(Location of pressure sensor B)=(Xb, 0), wherein Xb is a real number larger than 0 and smaller than Xa,
(Location of pressure sensor C)=(Xb, Yc), wherein Yc is any real number larger than 0,
(Location of pressure sensor D)=(−Xb, Yc),
(Location of pressure sensor E)=(−Xb, 0),
(Location of pressure sensor F)=(−Xa, 0), In the transmission path for a signal output from the pressure sensors 1, the leading wire 3 forms a portion extended from the pressure sensor 1, and comprises a metal wire having a relatively small wire diameter, and an insulating coating. This leading wire 3 is provided to each of the pressure sensors 1. In other words, the sensor unit 10 has six leading wires 3 in total.

In the transmission path for a signal output from the pressure sensors 1, the cable 4 forms a portion extended from the ECU 2, and comprises a wire material having a wire diameter somewhat larger than that of the leading wire 3. This cable 4 is also provided to each of pressure sensors 1 similarly as the leading wire 3. In other words, the sensor unit 10 has six cables 4 in total. The six cables 4 are bundled at a position before connected to the ECU 2, and then connected to the ECU 2 as a plied wire.

In the transmission path for a signal output from the pressure sensor 1, the terminal linking member 5 forms a connecting portion of the portion formed with the leading wire 3 and the portion formed with the cable 4. More specifically, the terminal linking member 5 comprises a metal fragment with a suitable conductivity, and to one end thereof, an end portion of the leading wire 3 is fastened, and to the other end thereof, an end portion of the cable 4 is fastened. The terminal linking member 5 is provided to each of the pressure sensors 1. In other words, the sensor unit 10 has six terminal linking members 5 in total.

The holder film 6 has a front layer and a back layer, and sandwiches and holds between these two layers, six pressure sensors 1, and a leading wire 3, a cable 4, and a terminal linking member 5 for each of the pressure sensors 1. In other words, in the sensor unit 10, each of the pressure sensors 1, and a leading wire 3, a cable 4, and a terminal linking member 5 for each of the pressure sensor 1 are held in the holder film 6 by being attached to the holder film 6. The holder film 6 comprises a material having a suitable conductivity, for example, polyethylene naphthalate. The holder film 6 also has a thickness and a flexibility of an extent which allows the film to be easily deformed.

The holder film 6 according to the present embodiment is roughly divided into three regions as shown in FIG. 4, which specifically are a sensor attachment unit 6A, an intermediate portion 6B, and an expanded portion 6C. In the holder film 6, the sensor attachment unit 6A is a region where the pressure sensor 1 is attached. In a state that the sensor unit 10 is attached to the pad member P, the sensor attachment unit 6A is placed on the upper face of the pad member P, that is, on a face in the side to which a load is applied from an occupant.

To the sensor attachment unit 6A, the leading wires 3 extended from the pressure sensors 1 are also attached, in addition to the pressure sensors 1. The leading wires 3 extended from each of the pressure sensors 1 extend along the periphery of the sensor attachment unit 6A, toward the intermediate portion 6B, as shown in FIG. 4.

The sensor attachment unit 6A is explained more particularly such that the sensor attachment unit 6A comprises substantially circular portions to which the pressure sensors 1 are attached, and substantially linearly extended portions through which two pressure sensors 1 communicate with each other, as shown in FIG. 4. Among them, the portions through which the pressure sensors 1 communicate with each other are provided individually between the pressure sensors A and B, between the pressure sensors B and C, between the pressure sensors C and D, between the pressure sensors D and E, and between the pressure sensors E and F. The portion through which the pressure sensors C and D communicate with each other extends in the width direction, as shown in FIG. 5, in a state that the sensor unit 10 is attached to the pad member P. Here, the pressure sensors C and D are disposed the most forward among the six pressure sensors 1, and are two pressure sensors 1 (which correspond to the first detector and the second detector) arranged to be spaced in the width direction. In this sense, it can be said that the portion in the sensor attachment unit 6A, through which the pressure sensors C and D communicate with each other corresponds to the portion sandwiched between the first detector and the second detector in the width direction.

In addition, the portion through which the pressure sensors C and D communicate with each other comprises a first extending portion 6m located in the outer side in the width direction, and a second extending portion 6n located in the inner side in the width direction, as shown in FIG. 5. Two first extending portions 6m are provided to sandwich the second extending portion 6n, each extending linearly along the width direction. The second extending portion 6n extends linearly along the width direction at a rear-position relative to the first extending portion 6m. In other words, in the sensor attachment unit 6A of the holder film 6, the portion through which the pressure sensors C and D communicate with each other is in a configuration that the center portion in the width direction (the portion corresponding to the second extending portion 6n) is somewhat offset rearward.

The intermediate portion 6B is a substantially belt-shaped portion extended from the second extending portion 6n, and middle positions of the leading wires 3 extended from the pressure sensors 1 are attached thereto. More particularly, as shown in FIG. 4, six leading wires 3 in total are attached to the intermediate portion 6B to be arranged at equal intervals and in parallel. In a state that the sensor unit 10 is attached to the pad member P, the intermediate portion 6B enters the through hole 20 of the pad member P from its middle position.

The expanded portion 6C is a portion (a portion corresponding to the first portion) adjacent to the intermediate portion 6B on the side opposite to the sensor attachment unit 6A, which is wider than the intermediate portion 6B and has substantially rectangular shape. In other words, the intermediate portion 6B is a portion (a portion corresponding to the second portion) adjacent to the expanded portion 6C, which is narrower than the expanded portion 6C. Attached to the expanded portion 6C are: the leading wires 3 extended from the pressure sensors 1, the cables 4 extended from the ECU 2, and the terminal linking members 5 which fasten the end portions of the leading wires 3 and the end portions of the cables 4. More specifically, in the expanded portion 6C, the leading wires 3 individually provided to the pressure sensors 1, cables 4 and the terminal linking member 5 (hereinbelow, the leading wires 3 etc.) are arranged at equal intervals and in parallel, as shown in FIG. 4.

The interval at which the leading wires 3 etc. are arranged in the expanded portion 6C is wider than the interval at which the leading wires 3 are arranged in the intermediate portion 6B. This is to prevent adjacent terminal linking members 5 from contacting each other in the expanded portion 6C. Further, as shown in FIG. 4, the six terminal linking members 5 are disposed such that positions thereof are aligned in an end portion in the extending direction of the expanded portion 6C (the end portion in the side opposite to the side where the intermediate portion 6B is positioned). However, location of the terminal linking members 5 is not limited to the above, but may be shifted from each other in the extending direction of the expanded portion 6C.

In a state that the sensor unit 10 is attached to the pad member P, substantially all of the expanded portion 6C is accommodated in the through hole 20 of the pad member P. On the other hand, in the cable 4, a portion in the side more proximal than the expanded portion 6C, comes out from the lower end of the through hole 20, and extends to the ECU 2.

As above, in the present embodiment, since the expanded portion 6C is accommodated in the through hole 20 in the state that the sensor unit 10 is attached to the pad member P, the terminal linking member 5 is supposed to also be accommodated in the through hole 20. In other words, in the transmission paths for output-signals from the pressure sensors 1, the connecting portions of the portion formed with the leading wires 3 and the portion formed with the cables 4 are provided to be positioned inside the through hole 20. In addition, being positioned inside the through hole 20 makes the connecting portion disposed in an appropriate position relative to the pad member P.

Specifically, if the terminal linking members 5 constituting the connecting portions are on the upper face of the pad member P, there is a concern that a seat occupant has a feeling of a foreign object when seated on the present seat S. On the other hand, if the terminal linking members 5 are in a lower position of the pad member P, there is a concern that the seat frame that support the pad member P from below and the terminal linking member 5 interfere with each other. In addition, the holder film 6, to which the terminal linking member 5 is attached, should be extended also to the lower position of the pad member P, which may similarly result in the concern of interfering with the seat frame to damage itself. On the other hand, if the terminal linking members 5 and the expanded portion 6C of the holder film 6 to which the terminal linking members 5 are attached are accommodated in the through hole 20 formed in the pad member P, the inconvenience described above is inhibited, and it becomes possible to appropriately protect the terminal linking members 5 and the holder film 6.

However, when a relatively large load is applied around the through hole 20, there is a possibility that the load is transmitted to the terminal linking members 5, even if the terminal linking members 5 constituting the connecting portions are disposed in the through hole 20. In such a case, there is a concern that the terminal linking members 5 (namely, the connecting portions of the signal transmission paths) are warped and damaged. In particular, when a seat occupant kneels up on the seat cushion S1, a significantly increased load is applied to the portion of the pad member P where the seat occupant put his knee. At this time, if a knee of the seat occupant is put around the through hole 20, there is a concern that an excessive load is applied to the terminal linking members 5 in the through hole 20, and in this case, the terminal linking members 5 is warped and damaged together with the holder film 6.

Thus, in order to restrain a warping of the connecting portion as described above, the present embodiment uses a warp restraining member 12, and disposes the warp restraining member 12 together with the terminal linking members 5, inside the through hole 20. Hereinbelow, the warp restraining member 12 is specifically explained.

Figure 6:
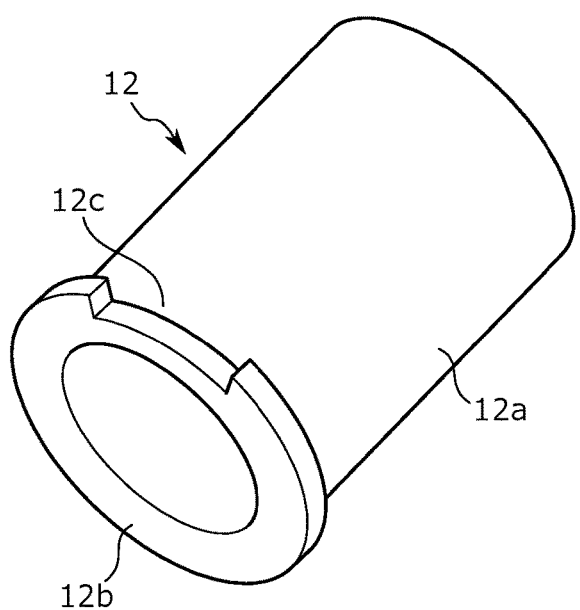
FIG. 6 is a perspective view showing a warp restraining member, according to an embodiment.

The warp restraining member 12 is a part formed with a resin material such as plastic or silicone rubber, and has a suitable hardness to restrain a warping of the connecting portion. The warp restraining member 12 also has an outline shape as illustrated in FIG. 6. FIG. 6 is a perspective view showing the warp restraining member 12.

In the present embodiment, the warp restraining member 12 comprises a cylindrical body having an elliptical cross section, and has an elliptically curved outer surface 12a. The warp restraining member 12 is not limited to a hollow body such as a cylindrical body, but may also be a solid body. The cross-sectional shape of the warp restraining member 12 is not limited to an elliptical shape, but may also be a circular shape or a polygonal shape.

The warp restraining member 12 comprises a flange portion 12b projected out from an end portion of the outer surface 12a. This flange portion 12b is formed over the entire circumference of the warp restraining member 12. As shown in FIG. 6, the flange portion 12b has a part rectangularly notched, which forms a recess portion 12c. The width of the recess portion 12c (the length in the circumferential direction of the warp restraining member 12) is slightly longer than the width of the intermediate portion 6B of the holder film 6.

The warp restraining member 12 configured as above restrains a warping of the connecting portion by fixing the terminal linking members 5 and each end portion of the leading wires 3 and the cables 4 fastened to the terminal linking members 5 onto the outer surface 12a thereof. Specifically, a portion of the holder film 6, to which the terminal linking members 5 and the each end portion of the leading wires 3 and the cables 4 are attached, namely, the expanded portion 6C, is wound around the warp restraining member 12 along the outer surface 12a. In this manner, the terminal linking members 5 and the each end portion of the leading wires 3 and the cables 4 are fixed onto the outer surface 12a of the warp restraining member 12.

Figure 7:
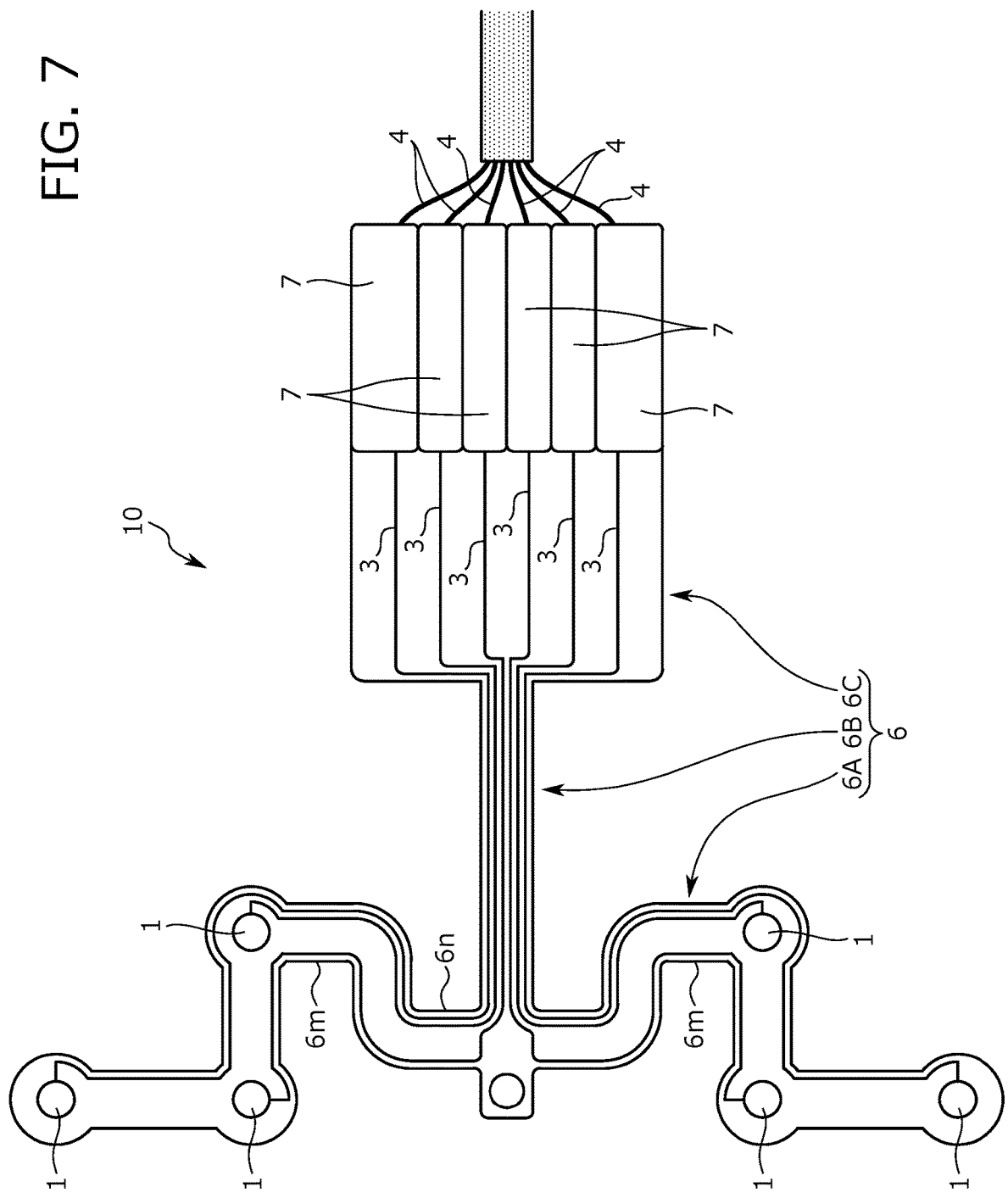
FIG. 7 is a view showing a sensor unit before wound around a warp restraining member, according to an embodiment.

More particularly, in the expanded portion 6C, in the region in which the terminal linking members 5 are arranged, every terminal linking member 5 is individually covered with an insulating tape 7, as shown in FIG. 7. This allows avoiding contact of the terminal linking members 5 to each other, when the expanded portion 6C is wound around the warp restraining member 12. FIG. 7 is a view showing the sensor unit 10 in a step before the expanded portion 6C is wound around the warp restraining member 12.

Figure 8:
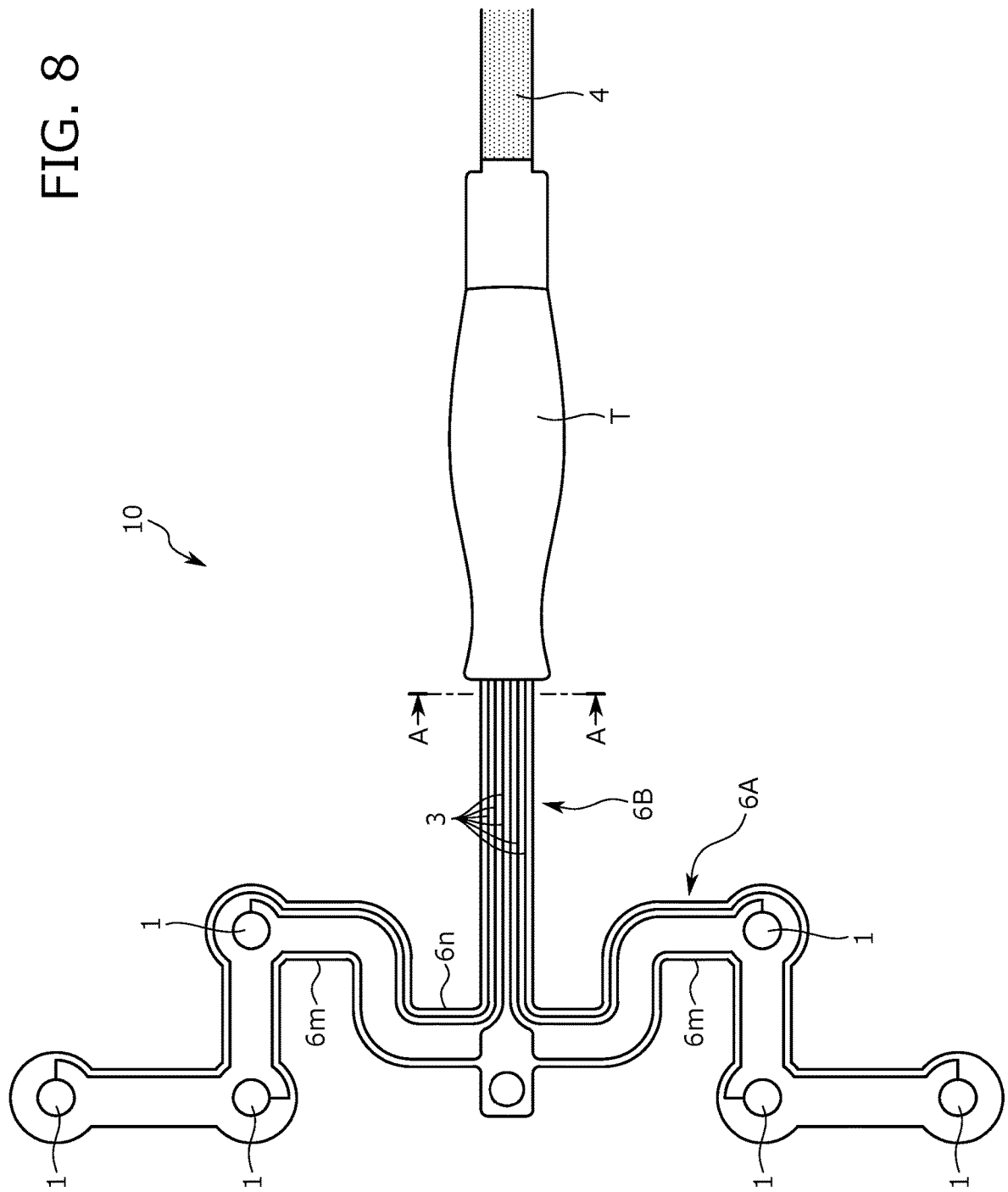
FIG. 8 is a view showing a sensor unit after wound around a warp restraining member, according to an embodiment.

The expanded portion 6C, in a state that the region having the terminal linking members 5 arranged is covered with the insulating tape 7, is wound around the warp restraining member 12, and then, the expanded portion 6C wound around the warp restraining member 12 is fixed thereto by being wrapped with an adhesive tape T. In this manner, the portions of the sensor unit 10 (specifically, the leading wires 3, the cables 4, and the terminal linking members 5) attached to the expanded portion 6C of the holder film 6 surround the warp restraining member 12 as a core material, as shown in FIG. 8. FIG. 8 is a view showing the sensor unit 10 in a state that the expanded portion 6C is wound around the warp restraining member 12.

Figure 9:
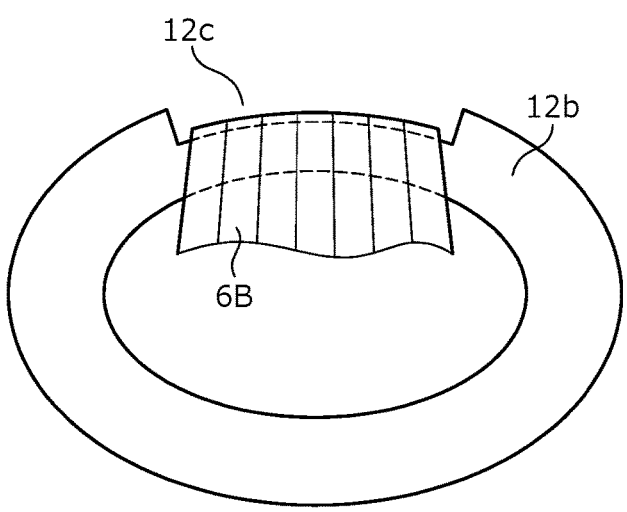
FIG. 9 is a view of the sensor unit shown in FIG. 8, when viewed from the A-A direction in the figure, according to an embodiment.

In this connection, when the expanded portion 6C is wound around the warp restraining member 12, the intermediate portion 6B of the holder film 6 comes into the recess portion 12c formed in the flange portion 12b of the warp restraining member 12, as shown in FIG. 9. FIG. 9 is a view of the sensor unit 10 illustrated in FIG. 8, when viewed from the A-A direction of the figure.

Accordingly, even when a positional deviation of the expanded portion 6C is concerned at the time the expanded portion 6C is wound around the warp restraining member 12, such positional deviation is generally inhibited, since the intermediate portion 6B comes into the recess portion 12c to lock a side edge of the intermediate portion 6B on the inner wall of the recess portion 12c. As a result, it becomes possible to favorably wind the expanded portion 6C around the warp restraining member 12. In an embodiment, the structure configured to inhibit the positional deviation of the expanded portion 6C at the time the expanded portion 6C is wound around the warp restraining member 12 is not limited to the recess portion 12c formed in the flange portion 12b. For example, it is possible to provide a projection for positional deviation inhibition on the outer surface 12a of the warp restraining member 12.

Moreover, by providing the recess portion 12c in the flange portion 12b, it becomes unnecessary to pass the intermediate portion 6B and the leading wires 3 attached to the intermediate portion 6B over the flange portion 12b. This allows for inhibiting the leading wires 3 from being damaged by abutting the edge of the flange portion 12b, or by other things.

Further, in the present embodiment, the outer surface 12a of the warp restraining member 12 is elliptically curved. In other words, since the outer surface 12a has no angular portion, it becomes possible to inhibit occurrence of damage when the expanded portion 6C abuts the outer surface 12a, at the time the expanded portion 6C is wound around the warp restraining member 12. However, shape of the outer surface 12a of the warp restraining member 12 is not particularly limited, and the outer surface 12a may be warped into a polygonal shape, having angular portions.

As above, the terminal linking members 5, together with the leading wires 3, the cables 4, and the expanded portion 6C are reinforced by the warp restraining member 12, by being fixed to the outer surface 12a of the warp restraining member 12. In other words, it becomes possible to inhibit a warping of the terminal linking members 5, even if a load is input to the terminal linking members 5, by resisting the input load, since the terminal linking members 5 become supported by the warp restraining member 12 having a sufficient hardness.

Then, the warp restraining member 12, around which the expanded portion 6C is wound, is inserted into the through hole 20, when the sensor unit 10 is attached to the pad member P. In this manner, the transmission paths for output-signals from each of the pressure sensors 1 are passed through the through hole 20. Then, a warping of the terminal linking members 5 (namely, a warping of the connecting portions) is generally restrained by the warp restraining member 12, inside the through hole 20.

In the present embodiment, in a state that the sensor unit 10 is attached to the pad member P, the warp restraining member 12 is fully accommodated in the through hole 20 (that is to say, not protruded out from the through hole 20). In this manner, a seat occupant is inhibited from having a feeling of foreign object, when seated on the present seat S. Hereinbelow, a positional relationship of the warp restraining member 12 and the through hole 20 is explained.

To explain a positional relationship of the warp restraining member 12 and the through hole 20, firstly, the through hole 20 and surrounding configuration are explained with reference to FIG. 5. In the pad member P, the through hole 20 is formed over from one end (the upper end) to the other end (the lower end) in the thickness direction of the pad member P. An opening in the upper end side of the through hole 20 is made slightly larger than the periphery of the warp restraining member 12 (strictly, the periphery of the flange portion 12b).

In the present embodiment, the through hole 20 is formed in a position forward of the six pressure sensors 1 and the sensor attachment unit 6A of the holder film 6, as shown in FIG. 5. This is because, since the pressure sensors 1 are disposed rearward in the seat cushion S1, if the through hole 20 is formed further rearward thereof, a seat occupant will have an unusual feeling when seated on the present seat S. The through-hole 20 is formed in the center portion of the pad member P in the width direction, as shown in FIG. 5. This reflects the fact that the six pressure sensors 1 and the sensor attachment unit 6A of the holder film 6 are in a formation bilaterally symmetric across the widthwise center position of the seat cushion S1.

Besides, in the present embodiment, a hanging groove Pa for hanging a covering material is formed along the width direction, each forward and rearward of the portion of the pad member P, where the six pressure sensors 1 and the sensor attachment unit 6A of the holder film 6 are disposed. The through hole 20 is formed in a position slightly rearward of the hanging groove Pa in the fore-side, as shown in FIG. 5. This is because, if the through hole 20 is formed in a position forward relative to the fore-side hanging groove Pa, a part of the leading wire 3 or the holder film 6 should be arranged in a manner straddling across the hanging groove Pa, which may cause a trouble during the work of hanging the covering material.

On the other hand, in the sensor attachment unit 6A of the holder film 6, the portion through which the pressure sensors C and D communicate with each other has the center portion in the width direction (the portion corresponding to the second extending portion 6n) offset rearward, as set forth above. In other words, a space is provided forward of the widthwise center portion of the portion through which the pressure sensors C and D communicate with each other. Then, the present embodiment utilizes the secured space for forming a through hole 20, as shown in FIG. 5. In other words, in the present embodiment, a space for forming the through hole 20 is appropriately secured, by rearwardly offsetting a part of the portion through which the pressure sensors C and D communicate with each other in the sensor attachment unit 6A.

Further, in the present embodiment, the through hole 20 is formed such that the rear end of the through hole 20 is positioned rearward relative to the fore-end of the widthwise end portion of the portion through which the pressure sensors C and D communicate with each other (the portion corresponding to the first extending portion 6m), as shown in FIG. 5. In this manner, it becomes possible to more effectively utilize the space secured by rearwardly offsetting the widthwise center portion of the portion through which the pressure sensors C and D communicate with each other, as a space for forming the through hole 20.

Figure 10:
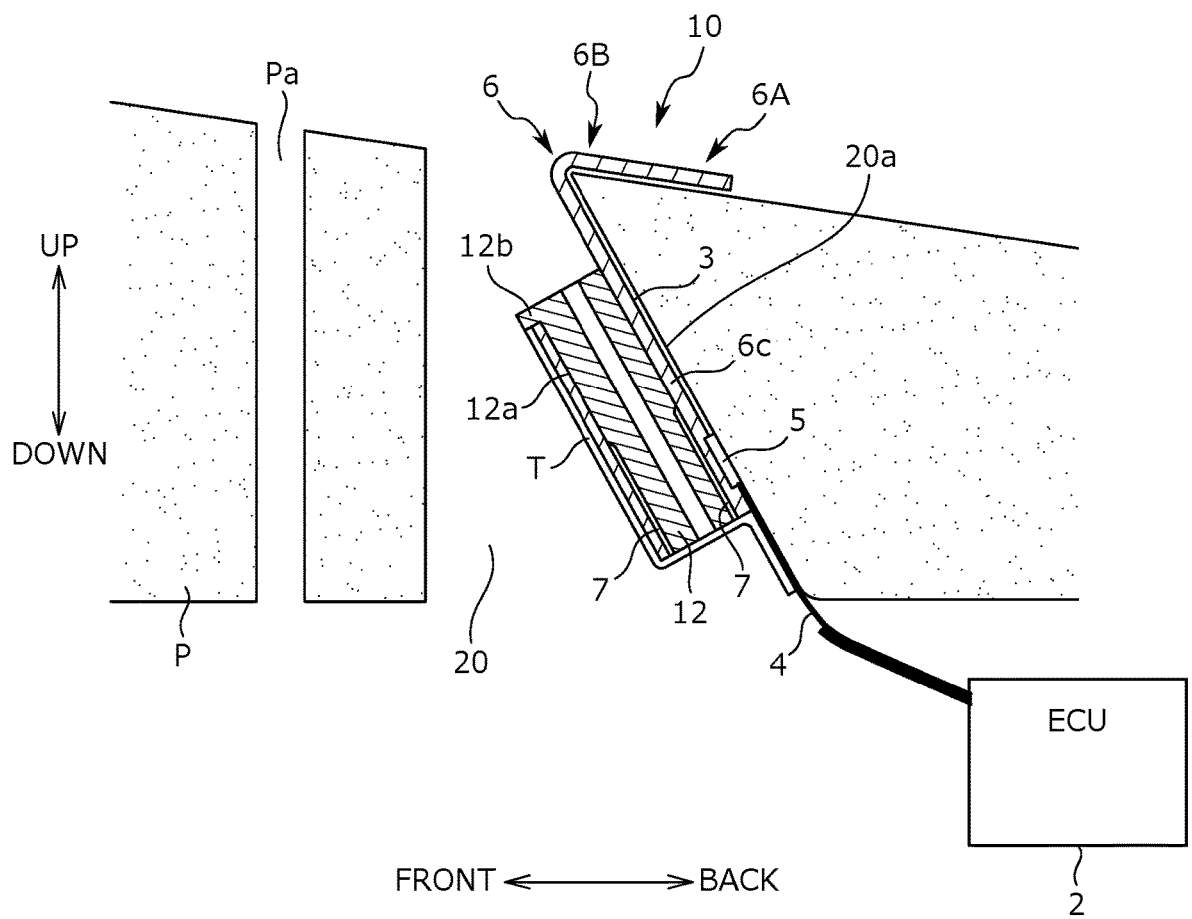
FIG. 10 is a view of the pad member and the sensor unit shown in FIG. 5, when cut through the B-B cross section in the figure, according to an embodiment.

Next, a positional relationship of the warp restraining member 12 and the through hole 20 is explained. In a state that the sensor unit 10 is attached to the pad member P, the warp restraining member 12 is inserted in the through hole 20, in a state along a partial region of the inner wall face of the through hole 20. More specifically, as shown in FIG. 10, in the inner wall face of the through hole 20, the rear side region forms a gradient face 20a. As shown in the figure, the gradient face 20a is inclined such that the upper end (the end closer to the pressure sensor 1) out of both ends in the thickness direction of the pad member P is positioned forward relative to the lower end (the end more distant from the pressure sensor 1). FIG. 10 is a schematic cross-sectional view of the pad member P and the sensor unit 10 illustrated in FIG. 5, when cut at the B-B cross section in the figure.

The warp restraining member 12 is inserted in the through hole 20, in a state along the region which forms the gradient face 20a of the inner wall face of the through hole 20. In other words, the warp restraining member 12 is provided to be disposed in the through hole 20, in an inclined (strictly, forwardly inclined) state relative to the thickness direction of the pad member P. In this manner, the warp restraining member 12 is accommodated within the through hole 20. More specifically, when the thickness of the pad member P is relatively thin, when the warp restraining member 12 is inserted into the through hole 20 in a state along the thickness direction of the pad member P, a portion of the warp restraining member 12 (e.g. the lower end portion) may sometimes protrudes from the through hole 20. In contrast, when the warp restraining member 12 is inserted into the through hole 20 in a state inclined relative to the thickness direction of the pad member P, it is possible to accommodate the entire warp restraining member 12 within the through hole 20, even if the thickness of the pad member P is thin.

In addition, the gradient face 20a as set forth above is positioned more rearwardly as it is inclined from the upper end to the lower end. Accordingly, the upper end portion (the end portion closer to the pressure sensor 1) of the warp restraining member 12 in the state along the gradient face 20a is positioned more forwardly and the lower end portion (the end portion more distant from the pressure sensor 1) is positioned more rearwardly. In this manner, it becomes possible to effectively inhibit a seat occupant from having a feeling of foreign object due to the warp restraining member 12, when the seat occupant is seated on the present seat S.

More clearly, in the warp restraining member 12 in the through hole 20, the upper end portion which is closer to the buttocks of a seat occupant is positioned forward in the seat cushion S1. In other words, when the seat occupant is seated on the present seat S, the upper end portion of the warp restraining member 12 is in a position forward of the buttocks of the seat occupant, specifically, nearly to the crotch. Thus, it is avoided in advance that the seat occupant has a feeling of foreign object due to the upper end portion of the warp restraining member 12. On the other hand, the lower end portion of the warp restraining member 12 is positioned more rearward in the seat cushion S1. However, since the lower end portion (strictly, the lower end portion and the center portion) of the warp restraining member 12 is sufficiently distant from the buttocks of a seat occupant, it is unlikely that the seat occupant has a feeling of foreign object due to the lower end portion of the warp restraining member 12.

As is clear from the above reasons, according to such a structure that the gradient face 20a inclines to be positioned rearward as it inclines from the upper end to the lower end, it becomes possible to effectively inhibit a seat occupant from being given a feeling of foreign object, when seated on a seat.

In this connection, the gradient pattern of the gradient face 20a is not limited to the above contents, but for example, the gradient face may incline to be positioned forward as it inclines from the upper end to the lower end. Alternatively, the gradient face may incline to be positioned leftward (or rightward) as it inclines from the upper end to the lower end. However, from the viewpoint of inhibiting the feeling of foreign object at seating, the gradient pattern as set forth above is desirable, that is to say, the gradient face desirably inclines to be positioned rearward, as it inclines from the upper end to the lower end.

Another Embodiment

In the embodiment described above, the pressure sensors 1 as detectors were provided to be disposed in the position directly below the seating face of the seat cushion S1. However, in terms of kinds of detectors and locations thereof, another example may be provided. As for the detectors, it is only requested to detect a target value which changes when a seat occupant is seated on the seat. For example, it is possible to use a shape sensor which detects a value according to a bone structure of a seat occupant (a bone structure of a portion which is in contact with the seat in the body of the seat occupant), or an electric potential sensor which detects a body electric potential of a seat occupant. As for locations of the detectors, it is not limited to the upper face of the pad member P of the seat cushion S1, but may also be a surface other than the upper surface (e.g., the lower face) of the pad member P. Alternatively, it may be the front face or the back face of the pad member P of the seat back S2.

Moreover, in the embodiment described above, in order to restrain a warping of the terminal linking members 5, the expanded portion 6C of the holder film 6 to which the terminal linking members 5 are attached is wound around the warp restraining member 12, such that the terminal linking members 5 are fixed onto the outer surface 12a of the warp restraining member 12. However, a structure configured to restrain a warping of the terminal linking members 5 with the warp restraining member 12 is not limited to the above contents. For example, it is possible to restrain a warping of the terminal linking members 5, by inserting the terminal linking members 5 and the expanded portion 6C into the hole of the warp restraining member 12 having a cylindrical body.

Figure 11:
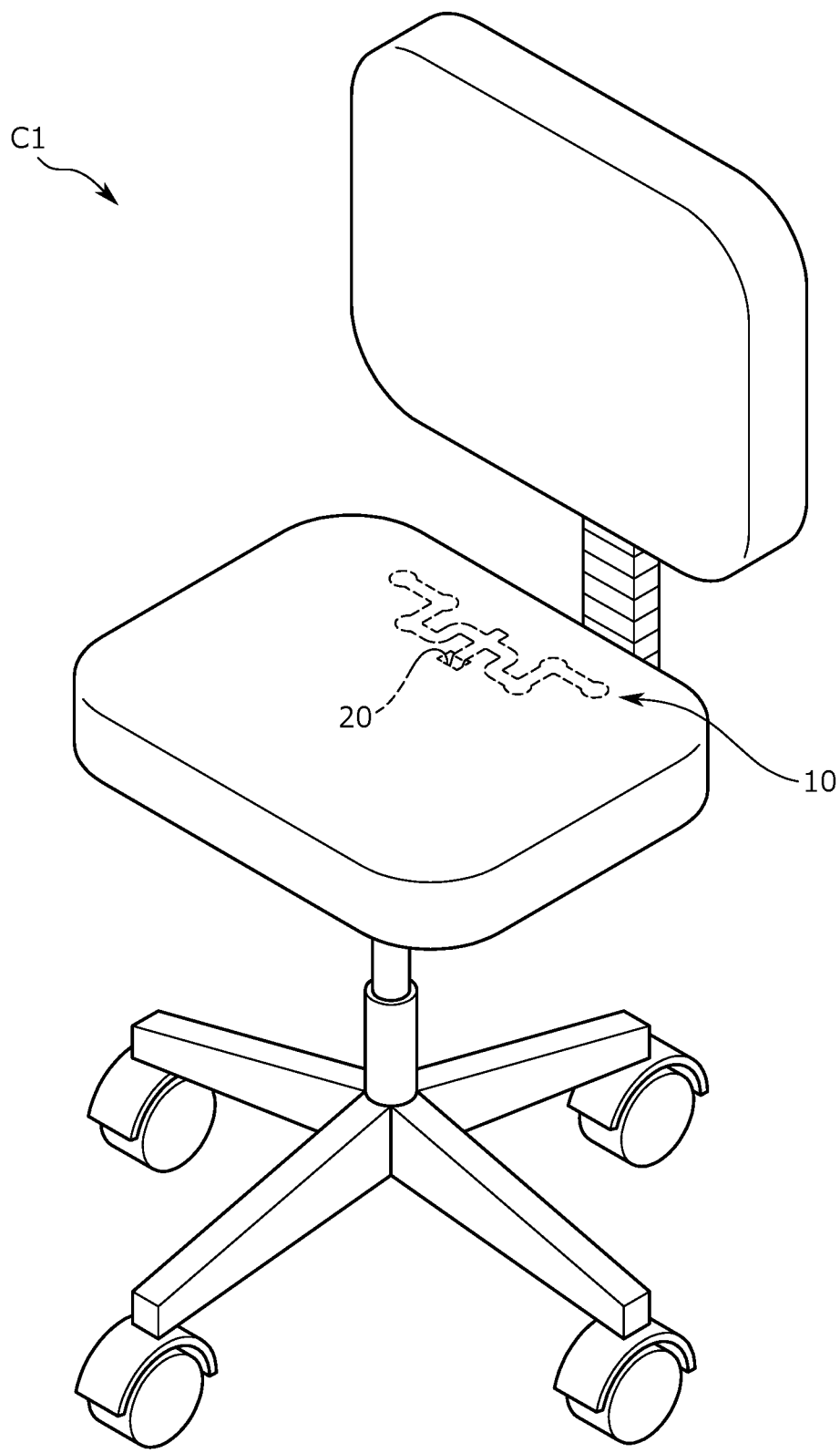
FIG. 11 is a view showing a seat with a detector, according to a modified example.

Further, although the above embodiment has been explained with taking a vehicle seat as an example of application of the present disclosure, the application is not limited thereto. The present disclosure is also applicable to a general administrative chair C1 as illustrated in FIG. 11. FIG. 11 is a view showing an administrative chair C1 provided with the sensor unit 10, as a seat with a detector according to a modified example. The present disclosure is also applicable to a seat for carriage other than those used in vehicles.

Seat Capable of Measuring Biosignal According to Second Embodiment of Present Disclosure The seat according to the second embodiment of the present disclosure relates to a seat capable of stably measuring biosignals of seat occupants, even when seat occupants vary in physique, and at the same time, capable of improving accuracy of wakefulness determination.

In recent years, in order to promptly inform of an occurrence of physical disorder of an occupant of a vehicle, if occurred, structures for detecting various parameters indicating conditions of an occupant of a vehicle to determine a physical disorder have been proposed. For example, Japanese Patent Publication JP 2009-106673 discloses a vehicle seat which comprises heartbeat sensors (described as electrocardiographic sensors in the publication) comprising heartbeat sensor electrodes (described as electrocardiographic sensor electrodes in the publication) disposed in a seat back, and a ground electrode disposed in a seat cushion. The heartbeat sensors detect electric potential signals from a heart of a seat occupant, as parameters indicating a condition of the occupant, to monitor a health condition.

Japanese Patent Publication JP 2007-301175 discloses an invention related to a biosignal collecting device comprising planar electrode groups in positions abutting the back, the waist to the buttocks, and the thighs of a seat occupant, which detects biosignals from difference signals of electric potential signals detected from each of the planar electrode groups. More specifically, the electric potential signals are electric potential signals emitted from around a heart or a lung, on the basis of which, the biosignal collecting device collects a biosignal of heartbeat, respiration, etc. of a seat occupant, with inhibiting signal noise, by setting one of the plural number of planar electrodes as one from which a neutral point electric potential for an amplifier is obtained.

In an embodiment, during an operation of a car, a contacting portion of a seat occupant and a seat is variable, due to occurrence of jolting, and centrifugal force that works during running on a curve, etc. Moreover, when physique of seat occupants varies, a point where a biosignal is appropriately detected varies. Therefore, it has been difficult to stably detect a biosignal from a seat occupant. This problem has been particularly noticeable when a biosignal detected by a sensor provided to a seat back is targeted. The reason thereof is that in a seat back, a contacting portion with a seat occupant which changes to front or back and to right or left due to jolting of a car, and significantly varies depending on difference in physique of seat occupants. By the heartbeat sensors described in the JP 2009-106673 Publication, it was difficult to appropriately detect an electrocardiographic signal for the reason above, since the heartbeat sensor electrodes were provided only in the seat back.

On the other hand, the planar electrode group described in the JP 2007-301175 Publication is capable of obtaining an electric potential signal more stable than the one described in the JP 2009-106673 Publication, for having arbitrary one of the planar electrodes as a ground electrode, while obtaining electric potential signals from the other two, and because the electric potential signals are signals relating to heartbeat and respiration. However, the signals detected for heartbeat and respiration by the planar electrode group described in the JP 2007-301175 Publication are only electric potential signals, which are divided into signals based on heartbeat and those based on respiration, on the basis of frequencies of the electric potential signals. In other words, the planar electrode group described in the publication had a high probability that, when normal electric potential signals were not obtained from a seat occupant, signals of both of heartbeat and respiration became not normal, which lowered accuracy in wakefulness determination in some cases.

A vehicle seat Sa according to the second embodiment of the present disclosure, is explained below. Firstly, the overall structure of the vehicle seat Sa is explained with reference to FIG. 12 and FIG. 13. In the explanation below, traveling direction of a vehicle is referred to as forward direction, the opposite is referred to as rearward direction, and vehicle height direction is referred to as up to down direction.

Figure 12:
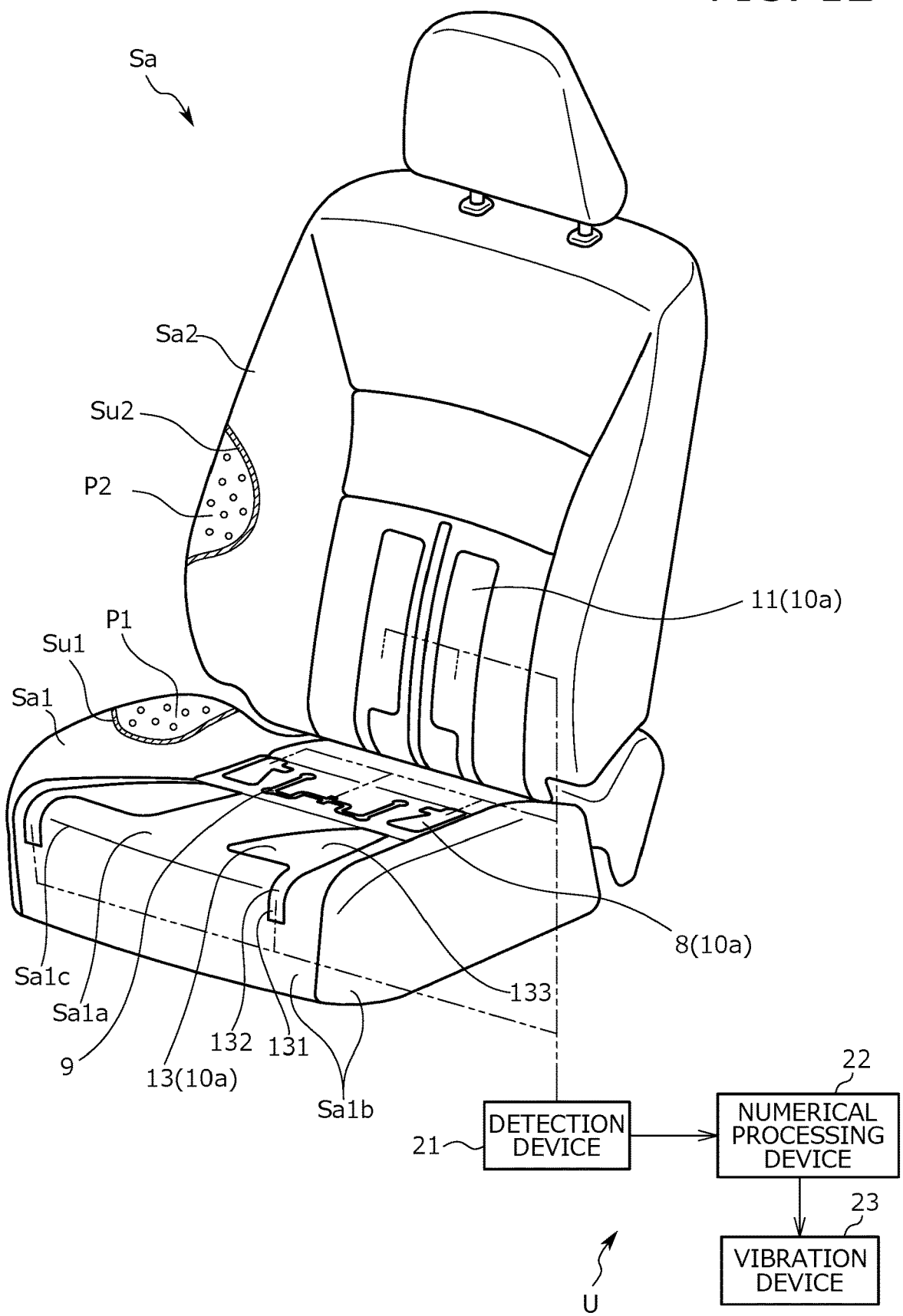
FIG. 12 is a perspective view showing an overall structure of a vehicle seat according to a second embodiment.
Figure 13A:
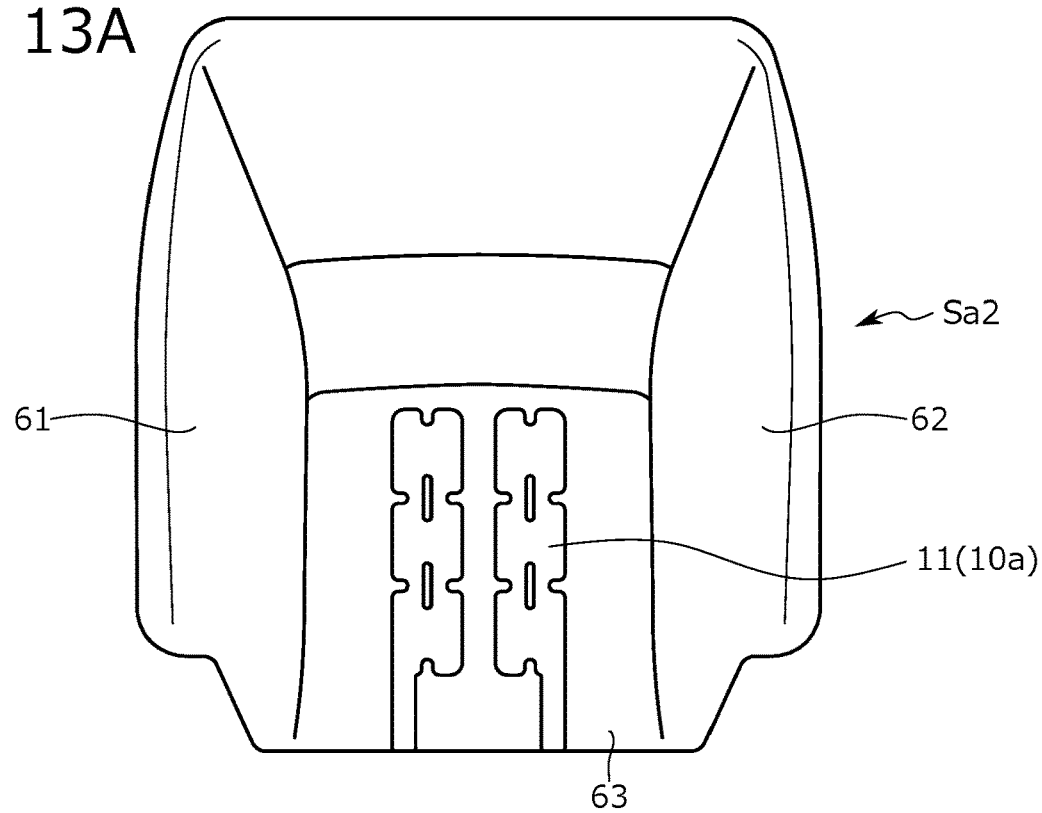
FIG. 13A is a schematic front view showing a seat back comprising upper electrode units constituting heartbeat sensors, according to an embodiment.
Figure 13B:
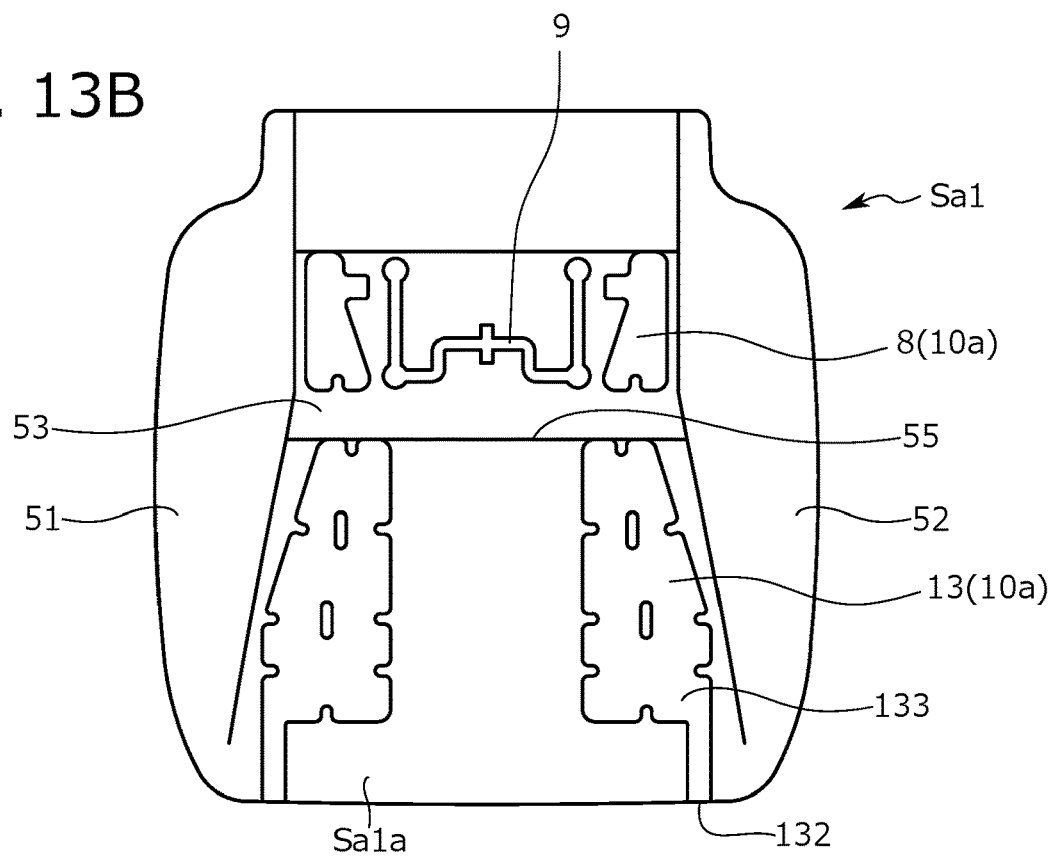
FIG. 13B is a schematic plan view showing a seat cushion comprising rear-electrode units and fore-electrode units constituting heartbeat sensors, and a respiration sensor, according to an embodiment.

Here, FIG. 12 is a perspective view showing an overall structure of a vehicle seat Sa according to the second embodiment; FIG. 13A is a schematic front view showing a seat back Sa2 comprising upper electrode units 11 constituting heartbeat sensors 10a; and FIG. 13B is a schematic plan view showing a seat cushion Sa1 comprising rear-electrode units 8 and fore-electrode units 13 constituting the heartbeat sensors 10a, and a respiration sensor 9. In an embodiment, in FIG. 12, FIG. 13 and FIG. 18 (described below), locations of the respiration sensor 9, the heartbeat sensors 10a, etc. are clearly shown by omitting some of parts constituting the same (e.g., a leading wire 11d and a leading wire 8d). As shown in FIG. 12, the vehicle seat Sa comprises the seat cushion Sa1 which is a portion on which a seat occupant is seated, the seat back Sa2 which is a portion pivotally attached to a rear-portion of the seat cushion Sa1, which corresponds to a backrest of a seat occupant, and a wakefulness supporting device U that support wakefulness of a seat occupant.

The seat back Sa2 has a cushion pad P2 made of urethane, and a covering material Su2 provided in a manner covering the cushion pad P2. As shown in FIG. 12 and FIG. 13A, in the seat back Sa2, the upper electrode units 11 are also arranged in positions facing the waist of a seat occupant.

The seat cushion Sa1 has a cushion pad P1 made of urethane, and a covering material Su1 provided in a manner covering the cushion pad P1. As shown in FIG. 12 and FIG. 13B, also arranged in the seat cushion Sa1 are: the respiration sensor 9 and the rear-electrode units 8 in positions facing the buttocks of a seat occupant; and forward thereof, the fore-electrode units 13 in positions facing the thighs of a seat occupant.

FIG. 12, FIG. 13B, etc. show a structure in which sensors and electrode units such as the respiration sensor 9, the upper electrode units 11, the rear-electrode units 8 and the fore-electrode units 13 are arranged on a seating face. On the other hand, it is also possible to arrange them between the cushion pad P2 and the covering material Su2, or between the cushion pad P1 and the covering material Su1, to thereby obtain a desirable appearance. The heartbeat sensor 10a comprising the rear-electrode units 8, the fore-electrode units 13 and the upper electrode units 11; the respiration sensor 9; a detection device 21; a numerical processing device 22; and a vibration device 23 form the wakefulness supporting device U, and details thereof are explained below.

Structure of Wakefulness Supporting Device

Figure 14:
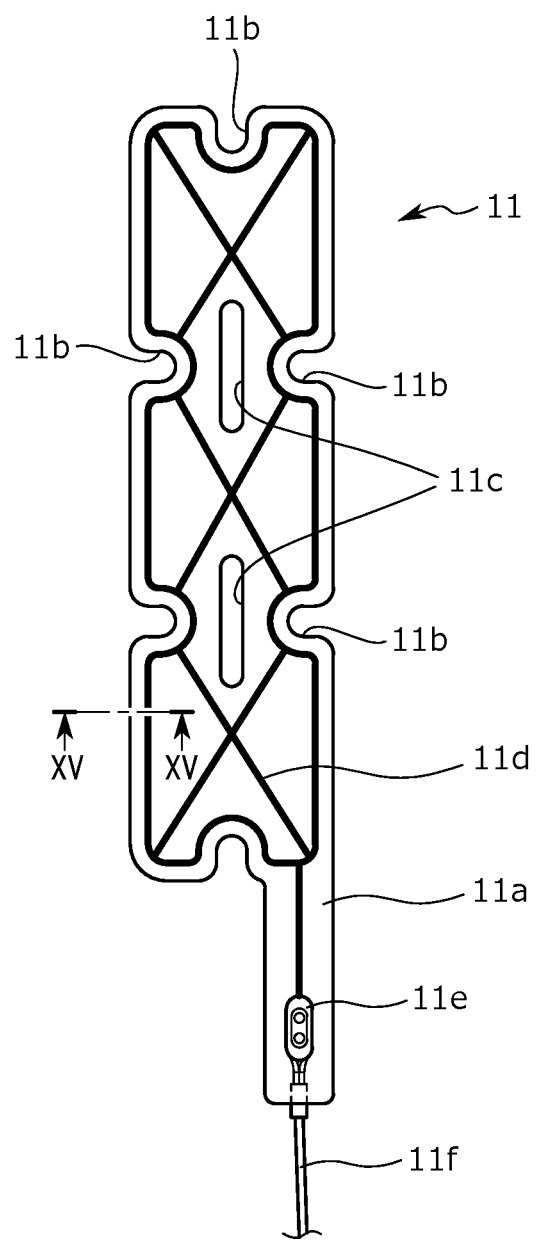
FIG. 14 is an enlarged view showing an upper electrode unit, according to an embodiment.
Figure 15:
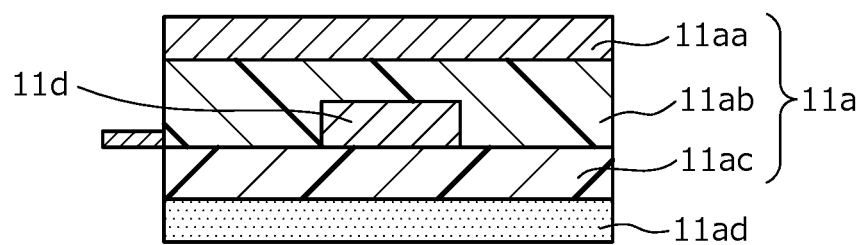
FIG. 15 is a cross-sectional view of a part of the upper electrode unit, which is a view showing the XV-XV cross section of FIG. 14, according to an embodiment.
Figure 16:
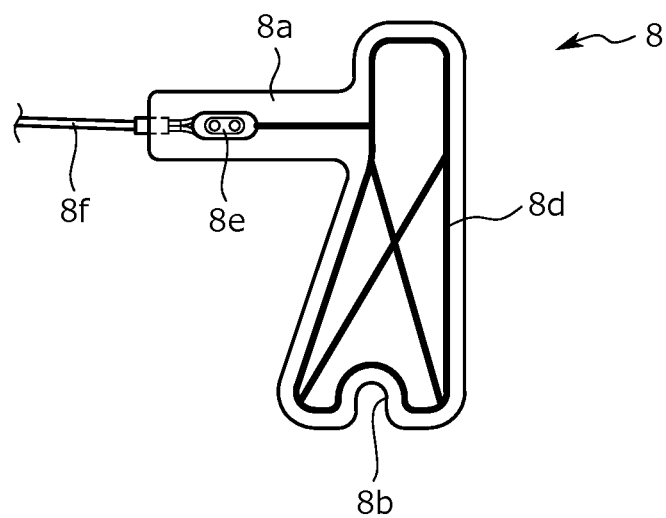
FIG. 16 is an enlarged view showing a rear-electrode unit, according to an embodiment.
Figure 17:
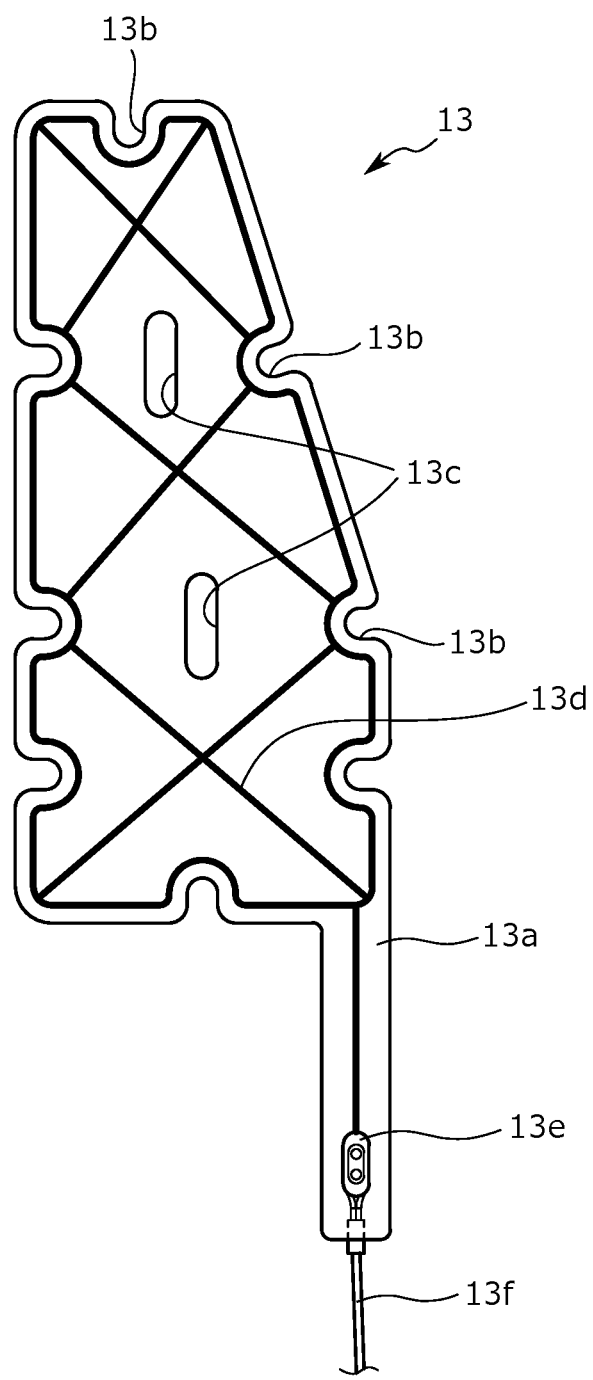
FIG. 17 is an enlarged view showing a fore-electrode unit, according to an embodiment.

The wakefulness supporting device U is explained with reference to FIG. 14 to FIG. 17, in addition to FIG. 12 and FIG. 13. Here, FIG. 14 is an enlarged view showing an upper electrode unit 11; FIG. 15 is a view showing an XV-XV cross section of FIG. 14, which is a cross-sectional view of a portion of the upper electrode unit 11; FIG. 16 is an enlarged view showing a rear-electrode unit 8; and FIG. 17 is an enlarged view showing the fore-electrode unit 13.

The wakefulness supporting device U is a device mainly configured to support wakefulness of a seat occupant who mainly is a driver, and comprised of the respiration sensor 9, the heartbeat sensor 10a, the detection device 21, the numerical processing device 22, and the vibration device 23.

The respiration sensor 9 is configured to detect a pressure signal which is a signal indicating a level of consciousness which fluctuates according to respiration of a seat occupant, and comprises a publicly known pressure sensor. For example, the respiration sensor 9 comprises a piezoelectric sensor-type pressure sensor, a semiconductor piezoresistive-type pressure sensor, a strain gauge-type pressure sensor, a capacitance-type pressure sensor or a silicon resonant-type pressure sensor, or the like. The respiration sensor 9 in the example of the present embodiment forms a substantially M letter-shape, and arranged in the seat cushion Sa1 such that the open side thereof faces rearward.

The heartbeat sensor 10a is configured to detect an electrocardiographic signal which is an action potential signal generated according to pulsation of a heart of a seat occupant, and which is a signal indicating a level of consciousness. The heartbeat sensor 10a is comprised of the upper electrode units 11 provided in a pair in the seat width direction of the seat back Sa2, and the rear-electrode units 8 and the fore-electrode units 13 provided forward and rearward each in pairs in the seat width direction of the seat cushion Sa1.

Upper Electrode Unit

The upper electrode unit 11 corresponds to a second electrode unit, and as shown in FIG. 14, being formed into a sheet state with a rectangular shape which is long generally in up to down direction, having an area of about 100 cm2, and having a capacitance of about 3000 pF. Further, the upper electrode unit 11 is mainly formed with a conductive sheet 11a, and is adhered onto the cushion pad P2 of the seat back Sa2 with a double-sided tape 11ad that is adhered to the back face of the conductive sheet 11a.

As shown in FIG. 15, the conductive sheet 11a has a laminated structure comprising a first resin film 11ac, a leading wire 11d attached to the first resin film 11ac, a second resin film 11ab adhered to the first resin film 11ac in a manner sandwiching the leading wire 11d, and an ink 11aa applied to the second resin film 11ab. In the present embodiment, the first resin film 11ac is formed with PET (Poly Ethylene Terephthalate).

A portion of the conductive sheet 11a including the leading wire 11d formed with silver extends downward, protruding from the rectangular shape, at a lower portion in the outer side in the seat width direction of the upper electrode unit 11, with the end portion thereof linked to a cable 11f by a terminal linking member 11e.

The terminal linking member 11e is formed with a metal fragment having a suitable conductivity, and to one end thereof, an end portion of the leading wire 11d is fastened, and to the other end thereof, an end portion of the cable 11f is fastened. The cable 11f is then connected to the detection device 21 which is described below. The second resin film 11ab is formed with a carbon resin, and the ink 11aa is a metal ink comprising BaTiO$_3$ (barium titanate).

In the conductive sheet 11a, total six cuts 11b are formed, each one in the center of the upper and lower edges, and each two at a distance in the up to down direction in the left and right edges, in the present embodiment. These cuts 11b are formed into a semi-long hole shape having an arcuate edge. In addition, between each pair of cuts 11b in the right to left direction formed on the left and right edges of the conductive sheet 11a, each one long hole-shaped cut out portion 11c is formed and extends longer than the cuts 11b in the up to down direction. This cut out portion 11c has both edges accurately shaped, and is formed into a long hole shape. The leading wire 11d is arranged along the circumference of the upper electrode unit 11, and extends inside the circumference crosswise, spreading out in a manner linking the portions of four corners of the leading wire 11d along the circumference and the portions of the leading wire 11d along the cuts 11b. In particular, towards the leading wire 11d along the cuts 11b formed on both sides in the seat width direction, other two leading wires extend, and these are arranged to be connected at different positions.

As described above, since the cuts 11b and the cut out portions 11c are formed, a stress applied to the upper electrode unit 11 as the covering material Su2 is bent is dispersed due to the cuts 11b and cut out portions 11c. Since a stress is thus dispersed, it is possible to inhibit the upper electrode unit 11 from being locally bent in an acute angle, and to prevent generation of wrinkles in the upper electrode unit 11. Accordingly, when the covering material Su2 is bent, the upper electrode unit 11 is bent along the covering material Su2, without causing wrinkles, due to the cuts 11b and the cut out portions 11c, and therefore, it is possible to control a stress from concentrating in one portion of the leading wire 11d, and it is possible to prevent disconnection of the leading wire 11d.

The leading wire 11d is spread out planarly crosswise in the conductive sheet 11a, and at intersections thereof, two or less leading wires 11d intersect, and three or more leading wires 11d do not intersect. Since the number of leading wire 11d which intersects at the intersections of the leading wires 11d is thus limited to two or less, it is possible to dispose the leading wires 11d planarly in the conductive sheet 11a, and at the same time, to make influence limitative when a disconnection has occurred.

Rear-Electrode Unit

The rear-electrode unit 8 corresponds to a second electrode unit, and has a function of detecting a body electric potential of a seat occupant, and as shown in FIG. 16, being formed into a sheet state with a generally right-angled triangle shape, has an area of about 40 cm2, and has a capacitance of about 1200 pF. The rear-electrode unit 8 is mainly formed with a conductive sheet 8a having a thickness and a laminated structure similar to those of the conductive sheet 11a. The rear-electrode unit 8 is adhered onto the cushion pad P1 of the seat cushion Sa1, with a double-sided tape adhered to the back face of the conductive sheet 8a, similarly as the upper electrode unit 11.

In an embodiment, a portion of the conductive sheet 8a including the leading wire 8d extends inward in the seat width direction, protruding from the right angled triangle shape, at a rear portion in the inner side in the seat width direction of the rear-electrode unit 8, with the end portion thereof linked to a cable 8f by a terminal linking member 8e. Here, the terminal linking member 8e and the cable 8f have similar constitutions with those of the terminal linking member 11e and the cable 11f.

In an embodiment, the contact position of the seat cushion Sa1 and the buttocks of a seat occupant is in an outer side in the seat width direction compared to the contact position of the seat back Sa2 and the waist of the seat occupant. To correspond to the relationship of the contact positions, the rear-electrode unit 8 provided to the seat cushion Sa1 is provided at an outer side in the seat width direction compared to the upper electrode unit 11 provided to the seat back Sa2. By thus arranging the upper electrode unit 11 and the rear-electrode unit 8, it becomes possible to obtain positions corresponding to contact portions of a human body, to stabilize detection of cardiac electric potential signals.

In the conductive sheet 8a, a cut portion 8b is formed in the center of the edge in the fore-side, in the present embodiment. This cut portion 8b is formed into a semi-long hole shape having an arcuate edge. The leading wire 8d is arranged along the circumference of the rear-electrode unit 8, and at the same time, arranged to extend inside the circumference crosswise.

Since the cut portion 8b is formed in the conductive sheet 8a, when the covering material Su1 is bent, the rear-electrode unit 8 is bent along the covering material Su1, without causing wrinkles, similarly as the conductive sheet 11a having the cut 11b. Thus, it is possible to control a stress from concentrating in one portion of the leading wire 8d, and it is possible to prevent disconnection of the leading wire 8d.

Further, in the leading wire 8d, a number of leading wire 8d which intersects at the intersections of the leading wire 8d is limited to two, similarly as the leading wire 11d. In this manner, it is possible to dispose the leading wire 8d planarly in the conductive sheet 8a, and at the same time, to make influence limitative when a disconnection has occurred.

The rear-electrode units 8 are disposed in a pair, in a manner sandwiching the respiration sensor 9 in the seat width direction. In other words, the rear-electrode units 8 are disposed together with the respiration sensor 9, in a position facing the buttocks of a seat occupant where contact stability is high. Since the respiration sensor 9 is thus disposed in a position facing the buttocks of a seat occupant, it becomes possible to stably detect a respiration signal of a seat occupant, and since the rear-electrode units 8 are disposed in a position facing the buttocks of a seat occupant, it becomes possible to stably obtain a body electric potential.

Fore-Electrode Unit

The fore-electrode unit 13 corresponding to a first electrode unit is configured to function as a ground electrode unit to be connected to a car body, and configured to obtain an electric potential to be a reference potential in removing an offset signal included in signals of the upper electrode unit 11 and the rear-electrode unit 8. The fore-electrode unit 13 is formed into a sheet state with a generally trapezoid shape, as shown in FIG. 17, having an area of about 170 cm$^2$, and having a capacitance of about 5200 pF. The fore-electrode unit 13 is mainly formed with a conductive sheet 13a having a thickness and a laminated structure similar to those of the conductive sheet 8a. The fore-electrode unit 13 is adhered onto the cushion pad P1 of the seat cushion Sa1, with a double-sided tape adhered to the back face of the conductive sheet 13a, similarly as the rear-electrode unit 8.

Then, the fore-electrode units 13 are provided in a straight line in the fore-side of the rear-electrode units 8, in a position facing the thighs of a seat occupant. In other words, since the rear-electrode units 8 in the position facing the buttocks of a seat occupant, and the fore-electrode units 13 facing the thighs of the seat occupant are provided on the fore and rear straight lines, it becomes possible to detect electrocardiographic signals of a same type waveform transmitted linearly. By thus detecting electrocardiographic signals of a same type waveform, it becomes possible to detect a magnitude of an electrocardiographic signal, and to distinguish physical condition of a seat occupant more accurately.

In an embodiment, a portion of the conductive sheet 13a including the leading wire 13d extends forward, protruding from the trapezoid shape, at a fore-portion in the outer side in the seat width direction of the fore-electrode unit 13, with the end portion thereof linked to a cable 13f by a terminal linking member 13e. Here, the terminal linking member 13e and the cable 13f have the similar constitutions with those of the terminal linking member 11e and the cable 11f.

In the conductive sheet 13a, total eight cut portions 13b are formed, each one in the center of the upper and lower edges, and each three at a distance in the up to down direction in the left and right edges, in the present embodiment. In addition, between each pair of cut portions 13b in the right to left direction formed on the left and right edges in the back side of the conductive sheet 13a, each one long hole-shaped cut out portion 13c is formed and extends longer than the cut portions 13b in the front to back direction.

Similarly as the conductive sheet 11a having the cuts 11b and the cut out portions 11c, a stress applied to the upper electrode unit 13 as the covering material Su1 is bent is dispersed due to the cut portions 13b and cut out portions 13c. Since a stress is thus dispersed, it is possible to inhibit the fore-electrode unit 13 from being locally bent in an acute angle, and to prevent generation of wrinkles in the fore-electrode unit 13. When the covering material Su1 is bent, the fore-electrode unit 13 is bent along the covering material Su1, without causing wrinkles, due to the cut portions 13b and the cut out portions 13c. Thus, it is possible to control a stress from concentrating in one portion of the leading wire 13d, and it is possible to prevent disconnection of the leading wire 13d.

The leading wire 13d is arranged along the circumference of the fore-electrode unit 13, and extends inside the circumference crosswise, spreading out in a manner linking the portions of four corners of the leading wire 13d along the circumference and the portions of the leading wire 13d along the each two cut portions 13b in the back side.

At intersections of the leading wires 13d of plural numbers, two leading wires 13d intersect, and three or more leading wires 13d do not intersect. Further, towards the leading wire 13d along each two cut portions 13b in the back side, formed on both sides in the seat width direction, other two leading wires extend, and these are arranged to be connected at different positions. Since the number of leading wire 13d which intersects at intersections of the leading wires 13d of plural numbers is thus limited to two, it is possible to dispose the leading wires 13d planarly on the conductive sheet 13a, and at the same time, to make influence limitative when a disconnection has occurred.

In the present embodiment, the rear-electrode units 8 and the fore-electrode units 13 constituting the heartbeat sensor 10a are arranged in the outer side in the seat width direction compared to the respiration sensor 9. By being thus arranged, the rear-electrode units 8 and the fore-electrode units 13 have outer side positions in the seat width direction not limited by the respiration sensor 9, and accordingly, it becomes possible to widen the area of the heartbeat sensor 10a outward of the respiration sensor 9. In addition, positions of the fore-electrode units 13 and the respiration sensor 9 shifted from each other increase probability that any of these sensors contacts with a seat occupant, facilitating detection of body signals of a seat occupant.

Furthermore, in the present embodiment, the upper electrode units 11 and the respiration sensor 9 constituting the heartbeat sensor 10a are arranged in positions overlapping with each other in the seat width direction. Being thus arranged, it becomes possible to share a portion which stably contacts with the body of a seat occupant in the seat front to back direction, making it possible to desirably detect a pressure signal and an electric potential signal.

The above has been explained on a supposition that the body electric potential is obtained at the rear-electrode unit 8, and the fore-electrode units 13 is set as a ground electrode unit. This is because, for detecting a body electric potential of the seat occupant, it is desirable to arrange the rear-electrode unit 8 in a portion corresponding to the buttocks of a seat occupant where it is easy to maintain a contact. This is also because the fore-electrode unit 13 provided in the seat cushion Sa1 is kept apart from the heart of a seat occupant, which allows obtaining an electric potential with a low influence of electrocardiographic signal. However, the structure is not limited to the above, and may also be such a structure where the rear-electrode unit 8 is set as a ground electrode unit, and the fore-electrode unit 13 is set as an electrode unit configured to detect a body electric potential. It is also possible to separately provide a ground electrode unit to the seat cushion Sa1, or to provide a ground electrode unit to the seat back Sa2, to thereby obtain a body electric potential of a seat occupant at least either at the rear-electrode unit 8 or at the fore-electrode unit 13.

Detection Device, Numerical Processing Device, and Vibration Device

As shown in FIG. 12, the detection device 21 is to detect a biosignal relating to an electrocardiogram signal from electric potential signals detected by the upper electrode unit 11 and the rear-electrode unit 8, and a reference electric potential supplied from the fore-electrode unit 13, and to detect a biosignal relating to a respiration signal from a pressure signal obtained from the respiration sensor 9; and formed with a ferrite core, a common mode noise filter, an operational amplifier, etc. which are not illustrated. The ferrite core and the common mode noise filter are attached to a DC power line and have a function of removing a conduction noise.

The numerical processing device 22 compares a respiration signal and an electrocardiogram signal according a the biosignal detected by the detection device 21 with individual predetermined reference values, and when it is determined that a level of wakefulness (level of consciousness or alertness) of a seat occupant has lowered, transmits a driving signal to the vibration device 23.

The vibration device 23 is a device provided with a so-called "vibration motor" comprising a publicly known unbalance mass motor, and drives the vibration motor for a predetermined time according to a driving signal received from the numerical processing device 22 to give a seat occupant a vibrational stimulation. For example, the vibration device 23 is provided inside the seat back Sa2.

Combinations of electrode units for comparing detected electric potential signals in the heartbeat sensor 10a are now explained. The numerical processing device 22 selects an arbitrary two from six electrode units which are capacitance sensors, and obtains electric potential signals of a seat occupant. Among the six electrode units, an arbitrary one is set to be a ground electrode unit. In an embodiment, the ground electrode unit may separately be provided to an arbitrary position, for example, may be provided between two capacitance sensors. This makes a favorable contact condition of a ground electrode unit and an occupant, which allows the ground electrode unit to stably supply a ground electric potential. Since the numerical processing device 22 is capable of processing a ground electric potential supplied from the ground electrode unit and a signal obtained from the other electrode units provided in the seat cushion Sa1 into a signal indicating a consciousness level of a seat occupant, it becomes possible to inhibit influence which accompanies a jolting of vehicle, a difference in physique, and a posture, to allow a highly accurate wakefulness determination.

The respiration sensor 9 provided in a rear side of the seat cushion Sa1 which is a portion corresponding to the buttocks of a seat occupant is capable of stably detecting a respiration signal, similarly. Accordingly, the numerical processing device 22 uses signals detected from the respiration sensor 9 and the heartbeat sensor 10a in combination to determine a wakefulness condition of a seat occupant, and thus it is possible to further enhance the determination accuracy. In the above embodiment, the respiration sensor 9 and the rear electrode unit 8 constituting the heartbeat sensor 10a are provided in the seat cushion Sa1 where it is easy to stably contact with a seat occupant. Therefore, it is possible to inhibit an electric potential signal from a seat occupant from becoming undetectable due to variation of contact position of a seat occupant and the vehicle seat Sa that is caused by a difference in physique, a posture, or the like of seat occupants. By further providing the heartbeat sensor 10a to the vehicle seat Sa separately from the respiration sensor 9, it becomes possible to desirably obtain or select signals necessary to a wakefulness determination, to enhance accuracy of a wakefulness determination.

Another Embodiment

Figure 18:
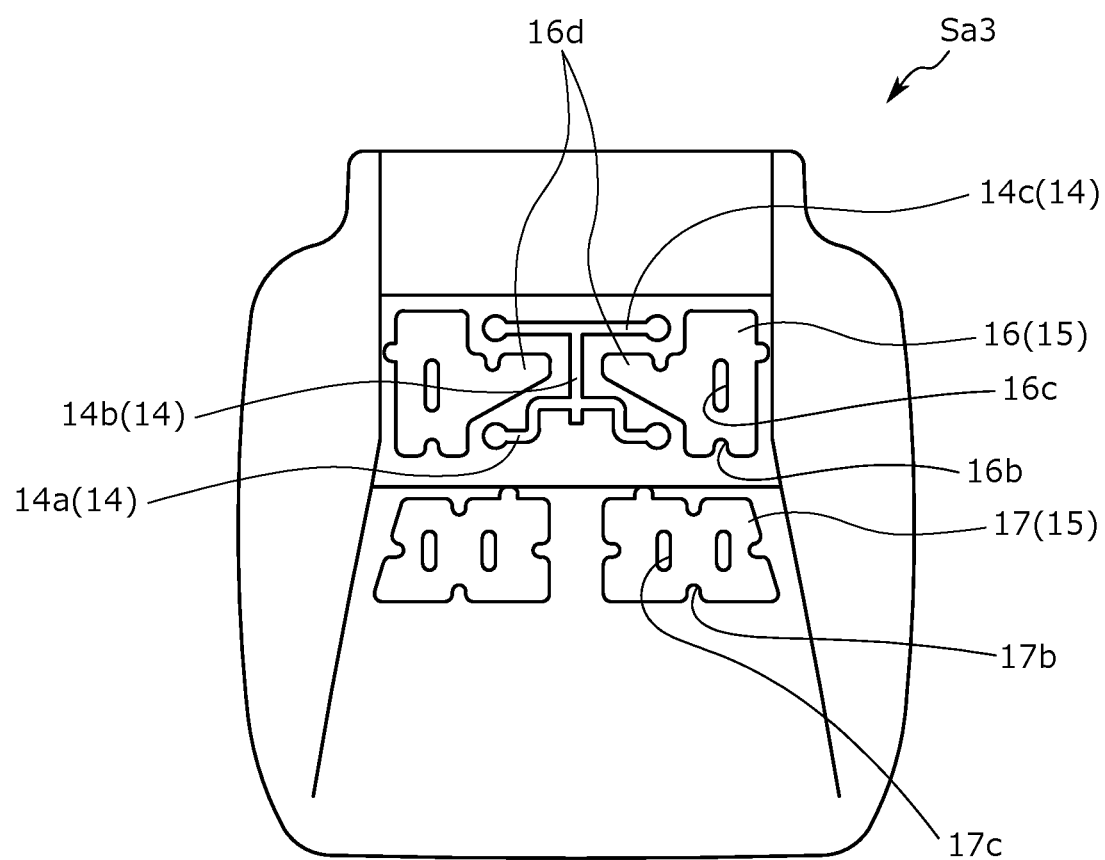
FIG. 18 is a schematic plan view showing a seat cushion comprising rear-electrode units and fore-electrode units constituting heartbeat sensors, and a respiration sensor, according to another embodiment.

A seat cushion Sa3 according to another embodiment is explained with reference to FIG. 18. Here, FIG. 18 is a schematic plan view showing the seat cushion Sa3 provided with a rear-electrode unit 16 and a fore-electrode unit 17 which consist a heartbeat sensor 15, and a respiration sensor 14, according to the another embodiment. In the present embodiment, with respect to overlapping structures of the above embodiment, the same signs are used and explanations thereof are omitted, in order to clarify difference from the example described in the above embodiment.

In the seat cushion Sa3, as shown in FIG. 18, the respiration sensor 14 and the rear-electrode units 16 which correspond to the second electrode units are arranged in positions facing the buttocks of a seat occupant, and forward thereof, fore-electrode units 17 which correspond to the first electrode units are arranged in a position facing the thighs of the seat occupant.

While having the same constitution with the respiration sensor 9, the respiration sensor 14 has a different shape from that of the respiration sensor 9, and is provided to a position facing the buttocks of a seat occupant. Specifically, the shape of the respiration sensor 14 is a shape of a combination of a fore-portion 14a in a bent-state which is extended in the seat width direction, a middle-portion 14b in a linear state which is extended in the sheet front to back direction, intersecting with the center portion of the fore-portion 14a, and a rear-portion 14c in a linear state having the center connected to the rear end of the middle portion 14b, which is extended vertically to the middle-portion 14b.

While having the same constitution with the heartbeat sensor 10a, the heartbeat sensor 15 has a different shape from that of the heartbeat sensor 10a. Specifically, a shape of a pair of the rear-electrode unit 16 constituting a part of the heartbeat sensor 15 is a generally rectangular shape having a long portion in the seat front to back direction, having a projecting portion 16d which projects inward in the seat width direction in a part. The projecting portion 16d corresponds to a protruding portion, and is formed to project inward in the seat width direction, through the fore-portion 14a to the rear-portion 14c of the respiration sensor 14 in the front to back direction.

Since the rear-electrode unit 16 thus comprises the projecting portion 16d, it becomes possible to arrange the respiration sensor 14, and the rear-electrode unit 16 of the heartbeat sensor 15 in the vicinity of the ischial tuberosity portion of a seat occupant where loads from the seat occupant are applied the most. Here, the position in the vicinity of the ischial tuberosity portion of a seat occupant refers to a position specified by a dummy conforming to SAE standards. By arranging the respiration sensor 14 and the heartbeat sensor 15 in this manner, it becomes easy to share a point where loads from a seat occupant are applied the most, between the heartbeat sensor 15 and the respiration sensor 14. In this manner, it is possible to maintain high accuracy in a detection of a signal detected from a seat occupant, even when body movement is occurring due to jolting of a vehicle, and to enhance accuracy of the wakefulness determination. Since the respiration sensor 14 and the rear-electrode unit 16 of the heartbeat sensor 15 are arranged in a position facing the ischial tuberosity portion where pressure from a seat occupant is the highest, it becomes possible to enhance a detection accuracy of the respiration sensor 14 and the heartbeat sensor 15.

The respiratory sensor 14 and the rear electrode unit 16 of the heartbeat sensor 15 according to the present embodiment are arranged in the seat cushion Sa3 where buttocks are seldom moved apart from the seat due to a body movement, even when buttocks are lifted by jolting of vehicle, with which loads applied from the buttocks fluctuate. This facilitates maintaining a contact of the respiration sensor 14 and the heartbeat sensor 15 with a seat occupant, to allow inhibiting occurrence of detection errors.

Furthermore, in the rear-electrode unit 16, a cut out portion 16c in the center of the rectangular shape, and a cut portion 16b in the fore-edge in the center of the rectangular shape and in the proximal end side of the projecting portion 16d, are formed similarly as in the rear-electrode unit 8. This cut portion 16b is formed into a semi-long hole state having an arcuate edge. The cut out portion 16c is formed into a long hole state with the both edges accurately shaped, and extends longer than the cut portion 16b in the up to down direction. By forming the cut portions 16b and the cut out portions 16c, a stress applied to the rear-electrode unit 16 as the covering material Su1 is bent is dispersed due to the cut portions 16b and the cut out portions 16c. Since a stress is thus dispersed, it is possible to inhibit the rear-electrode unit 16 from being locally bent in an acute angle, and to prevent generation of wrinkles in the rear-electrode unit 16. Thus, it is possible to control a stress from concentrating in one portion of a leading wire provided to the rear-electrode unit 16, to allow preventing disconnection of the leading wire.

A pair of fore-electrode unit 17 constituting a part of the heartbeat sensor 15 corresponds to one of the first electrode units, and disposed in the center portion in the front to back direction of the seat cushion Sa3. Differently from the fore-electrode unit 13, shape of the pair of fore-electrode unit 17 is formed such that a length in the front to back direction is short and a length in the seat width direction is long. In the fore-electrode units 17, each two cut out portions 17c extending in the front to back direction are formed side by side in the seat width direction, and cut portions 17b are formed in each approximate center of both edges in the front to back direction and in the seat width direction.

The fore-electrode unit 17 thus formed is provided to be disposed over a wide region in a position close to root of the legs of a seat occupant where less displacements occur, by being formed longer than the fore-electrode unit 13 in the seat width direction, in the center of the seat cushion Sa3. This increases chances of the fore-electrode unit 17 to contact with a seat occupant, even in such a condition that the seat occupant has the legs crossed, and allows desirably applying a ground potential.

In addition, in the fore-electrode unit 17, each two cut out portions 17c extending in the front to back direction are formed side by side in the seat width direction, and cut portions 17b are formed in each approximate center of both edges in the front to back direction and in the seat width direction.

In this manner, when the covering material Su1 is bent, the fore-electrode unit 17 is bent along the covering material Su1, without causing wrinkles, similarly as the rear-electrode unit 16 having the cut portions 16b and the cut out portions 16c. Thus, it is possible to control a stress from concentrating in one portion of a leading wire provided to the fore-electrode unit 17, to allow preventing disconnection of the leading wire.

The above has been explained on a supposition that the body electric potential is obtained at the rear-electrode unit 16, and the fore-electrode unit 17 is set as a ground electrode unit. This is because, for detecting a body electric potential of a seat occupant by the rear-electrode unit 16, it is desirable to arrange the projecting portions 16d of the rear-electrode unit 16 in a portion corresponding to the ischial tuberosity portion where it is easy to maintain a contact with the seat occupant. However, the structure is not limited to the above, and may also be such a structure where the fore-electrode unit 17 is set as a ground electrode unit, and the rear-electrode unit 16 is set as an electrode unit configured to detect a cardiac electric potential.

Although the above embodiment has been explained with taking a vibration device as an example which forms the wakefulness supporting device, the present disclosure is not limited to such structure. For example, it is also possible to use a display, a light, or a buzzer, or the like provided in a car to inform a seat occupant or a fellow passenger with an image, a light, or a sound, to directly or indirectly support wakefulness of the seat occupant.

Furthermore, although the above embodiment has been explained with taking a vehicle seat as an example, the present disclosure is not limited to such structure, and is also applicable to seats used in industrial equipment, airplanes, marine applications, theaters or other applications.

Vehicle Seat Comprising Capacitance-Type Sensor According to Third Embodiment of Present Disclosure The vehicle seat according to the third embodiment of the present disclosure relates to a vehicle seat comprising a capacitance-type sensor capable of stably detecting a cardiac electric potential of a seat occupant.

In order to promptly inform of a physical disorder of an occupant of a vehicle, if occurred, structures for determining physical disorder by detecting various parameters indicating a condition of an occupant have been proposed. As a structure for detecting a cardiac electric potential according to heartbeat of a seat occupant who is an occupant of a vehicle, a structure in which an electrode is provided inside a seat, in other words, on the back side of a covering material has been known (e.g., the JP 2009-106673 Publication). In such a structure, an electric potential detected by an electrode was lowered relative to a thickness of a covering material, which lowered accuracy of a heartbeat sensor, in some cases.

Techniques which have been known as a structure capable of preventing such a lowering of electric potential are techniques of conducting electricity from a covering material having suitable conductivity to an electrode layer provided on the back face of the covering material, through a conductive cloth (e.g., JP 2012-20002 Publication). However, in some cases, loads applied from a seat occupant to the conductive cloth through the covering material during operation broke through the conductive cloth over years of use, which made an electric potential undetectable from the electrode layer.

A vehicle seat Sb according to the third embodiment of the present disclosure is described below. Firstly, the overall structure of the vehicle seat Sb, and conductive cloths 31a, 31b and 31e provided to the seat back Sb2 are explained with reference to FIG. 19 to FIG. 21.

Figure 19:
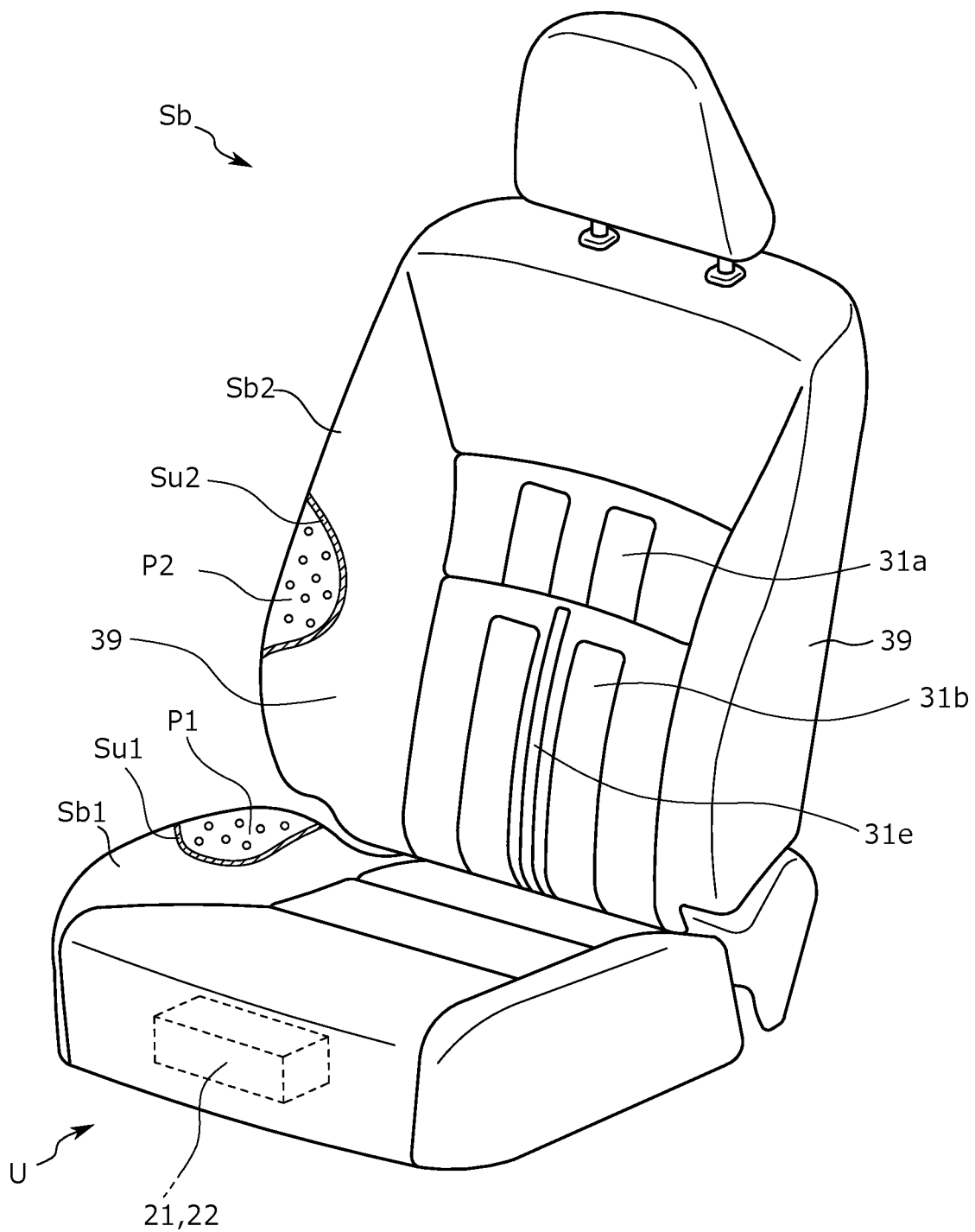
FIG. 19 is a perspective view showing an overall structure of a vehicle seat according to a third embodiment.
Figure 20:
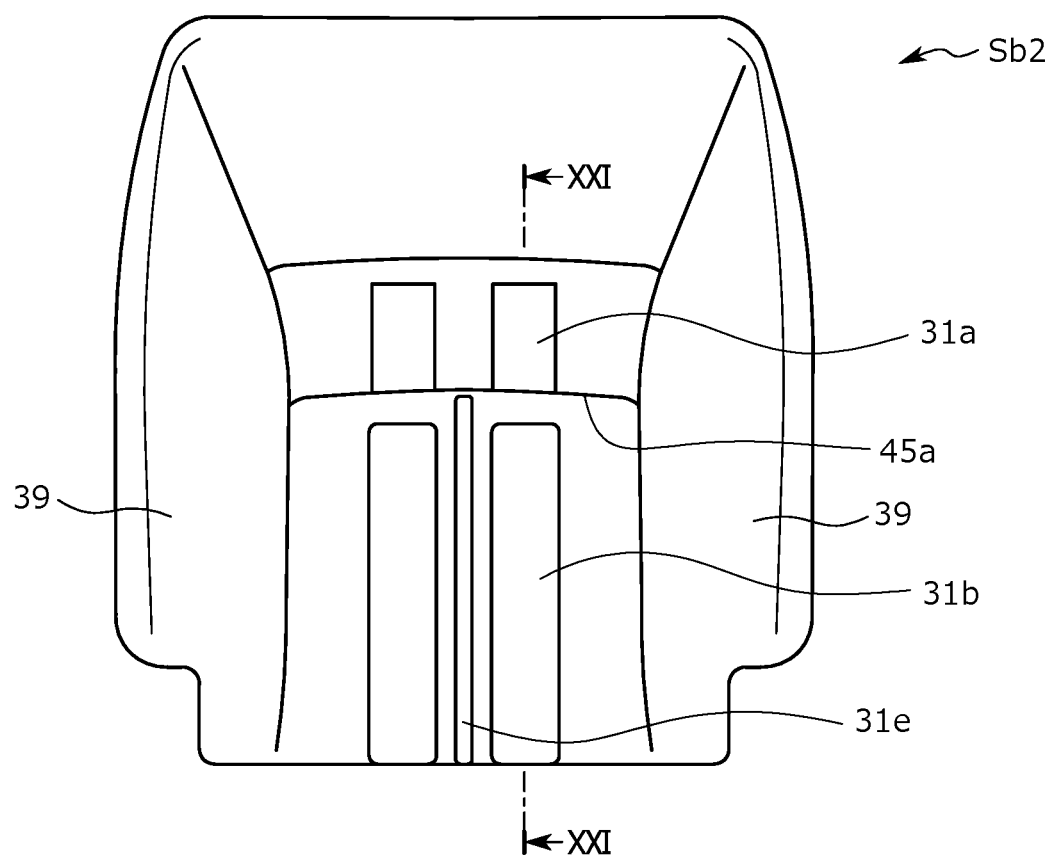
FIG. 20 is a schematic front view showing a seat back, according to an embodiment.
Figure 21:
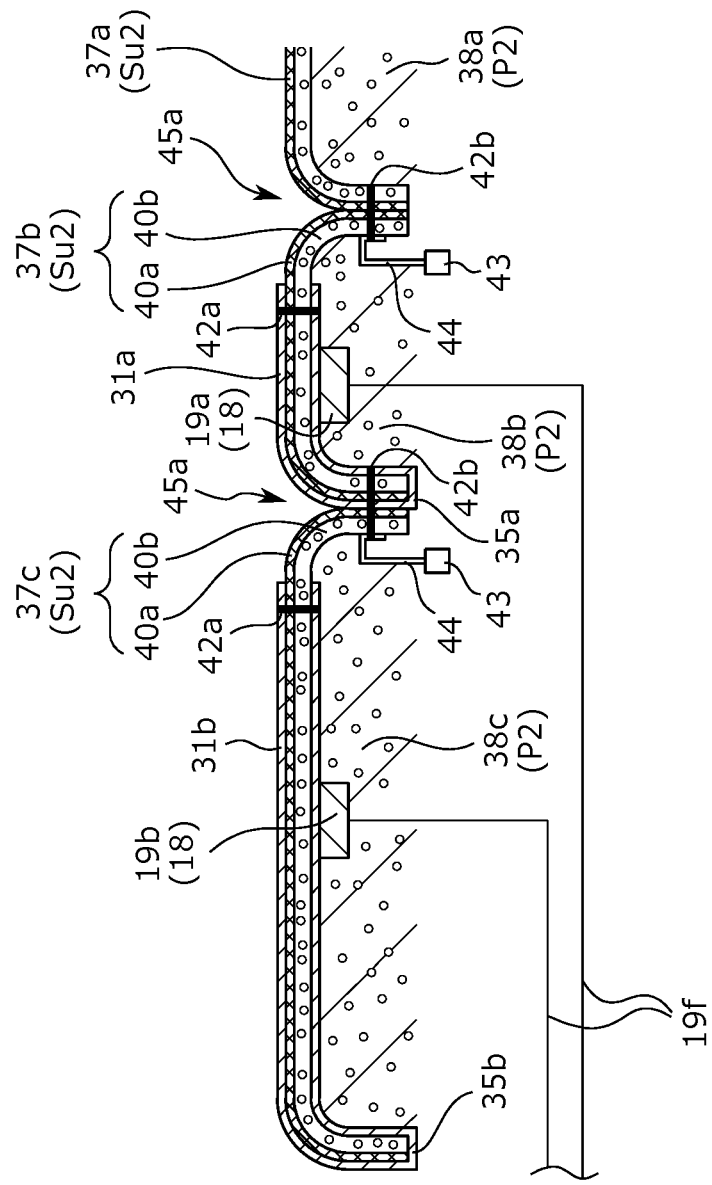
FIG. 21 is a side cross-sectional view of the seat back, which is a view showing the XXI-XXI cross section of FIG. 20, according to an embodiment.

Here, FIG. 19 is a perspective view showing an overall structure of the vehicle seat Sb according to the present embodiment; FIG. 20 is a schematic front view showing the seat back Sb2; and FIG. 21 is a view showing XXI-XXI cross section of FIG. 20, which is a side cross-sectional view of the seat back Sb2. As shown in FIG. 19, the vehicle seat Sb has the seat cushion Sb1 which is a portion on which a seat occupant is seated, the seat back Sb2 which is a portion attached to a rear-portion of the seat cushion Sb1, which corresponds to a backrest of a seat occupant, and a wakefulness supporting device U which supports wakefulness of a seat occupant.

The seat back Sb2 has a cushion pad P2 made of urethane, and a covering material Su2 provided in a manner covering the cushion pad P2. The covering material Su2 is formed of a covering 40a and a wadding 40b adhered to the back face of the covering 40a (see FIG. 21). On the seat back Sb2, a bank portions 39 formed in a manner swelled forward are formed in the both sides in the seat width direction. The seat back Sb2 is further provided with an upper electrode unit 19a and a lower electrode unit 19b which form a capacitance-type heartbeat sensor 18, in the center in the seat width direction excluding the bank portion 39, on the back side of the covering material Su2 between the cushion pad P2, as shown in FIG. 21.

The upper electrode unit 19a and the lower electrode unit 19b are attached to the seat back Sb2 in such a direction that the length in the seat width direction is shorter than the length in seat up to down direction. Then, in the back face side of the covering material Su2, conductive cloths 31a and 31b are connected respectively to a short length portion of the upper electrode unit 19a and the lower electrode unit 19b. The conductive cloths 31a and 31b are attached to partially be exposed on the surface of the covering material Su2, each formed to have a width of about 65 mm and in a pair in the center of the seat width direction with a center space of about 100 mm. The conductive cloths 31a and 31b each provided in a pair are respectively connected to the upper electrode unit 19a and the lower electrode unit 19b each provided in a pair, and electricity is conducted therefrom.

As described above, since the conductive cloths 31a and 31b are attached to the short portions of the upper electrode unit 19a and the lower electrode unit 19b, less width of the conductive cloths 31a and 31b can suffice the attachment to each of the electrode units, compared to a case of being attached to the long portions. As a result, the conductive cloths 31a and 31b can be made more compact. Focusing on making the conductive cloths 31a and 31b further thin and compact, it is preferred that the conductive cloths 31a and 31b be connected to the shortest edge of each of detection faces of the upper electrode unit 19a and the lower electrode unit 19b, respectively.

The seat back Sb2 is further provided with a conductive cloth 31e which is connected to a not illustrated car body and functions as a ground, between the cloth 31a and the cloth 31b in the seat width direction, in the center of the seat back Sb2. The conductive cloth 31e with a width of about 20 mm, extending from the lower end of the seat back Sb2 to a higher position than the conductive cloth 31b, is configured to obtain an electric potential to be a reference electric potential in removing an offset signal included in a signal from the upper electrode unit 19a and the lower electrode unit 19b.

The seat cushion Sb1 comprises a cushion pad P1 made of urethane, and a covering material Su1 provided in a manner covering the cushion pad P1. The seat cushion Sb1 is further provided inside with the upper electrode unit 19a, the lower electrode unit 19b, and the detection device 21 and the numerical processing device 22 which, together with the vibration device (not shown), form the wakefulness supporting device U. The detection device 21 is configured to detect a biosignal according to an electrocardiographic signal from an electric potential signal detected by the upper electrode unit 19a and the lower electrode unit 19b, and formed from a ferrite core, a common mode noise filter, an operational amplifier, etc. which are not illustrated. The ferrite core and the common mode noise filter are attached to a DC power line and have a function of removing a conduction noise. The numerical processing device 22 separates electrocardiographic signals from a biosignal detected by the detection device 21, which is compared with the individual predetermined reference values, and when it is determined that a level of wakefulness (level of consciousness) of a seat occupant has lowered, transmits a driving signal to a not illustrated vibration device. Then, the vibration device gives a seat occupant a vibrational stimulation to support wakefulness condition of the seat occupant.

Next, functions of the conductive cloth 31a and the conductive cloth 31b, and attachment of the conductive cloth 31a and the conductive cloth 31b to the covering material Su2 are explained. The conductive cloth 31a is connected to the upper electrode unit 19a, and the conductive cloth 31b is connected to the lower electrode unit 19b. Accordingly, a cardiac electric potential of a seat occupant is detected by the upper electrode unit 19a and the lower electrode unit 19b, without causing lowering of electric potential due to passing through the covering material Su2. Then the electric potentials detected by the upper electrode unit 19a and the lower electrode unit 19b are transmitted to the detection device 21 through a cable 19f.

The cushion pad P2 is divided into an upper pad 38a, a middle pad 38b and a lower pad 38c with a hanging groove 45a, in the center of the seat width direction of the seat back Sb2 excluding the bank portion 39. Here, the hanging groove 45a corresponds to a "portion extending in the seat width direction". Similarly, among the covering materials Su2 provided to the seat back Sb2, the covering material Su2 in the center of the seat width direction is configured to be divided from up to down into three of an upper covering material 37a, a middle covering material 37b, and a lower covering material 37c, covering the upper pad 38a, the middle pad 38b and the lower pad 38c, respectively.

The upper covering material 37a, the middle covering material 37b and the lower covering material 37c are attached with the end portions thereof taken in the hanging groove 45a provided to the cushion pad P2. Specifically, a wire 43 suspended in the seat width direction is attached inside the hanging groove 45a. A hook 44 in a J-letter shape attached to this wire 43 is engaged with a suture portion 42b in the terminal of the covering material Su2 to thereby attach the covering material Su2 to the seat back Sb2.

The conductive cloth 31a is formed into a belt-state in a manner extending long in the seat height direction, and comprises a turnover portion 35a which is turned over straddling the lower side terminal of the middle covering material 37b on the front face and the back face of the middle covering material 37b, at the position where it is attached to the hanging groove 45a. The turnover portion 35a of the conductive cloth 31a is sutured at the suture portion 42b together with the lower side terminal of the middle covering material 37b and the upper side terminal of the lower covering material 37c, and fixed to the seat back Sb2 by the hook 44 corresponding to a hanging portion. Since the turnover portion 35a where a partial positional deviation with the covering material Su2 tends to occur is fixed by the hook 44, it is possible to desirably prevent the positional deviation of the conductive cloth 31*a*. Further, the upper side terminals of the conductive cloth 31*a* in the both sides sandwiching the front and back faces of the middle covering material 37*b* are also sutured to the middle covering material 37*b* by a suture portion 42*a*.

The conductive cloth 31*b* is formed into a belt-state in a manner extending long in the seat height direction, and comprises a turnover portion 35*b* which is turned over straddling a terminal of the lower covering material 37*c* on the front face and the back face of the lower covering material 37*c* at the lower end portion of the seat back Sb2. Here, the lower end portion of the seat back Sb2 corresponds to a "portion extending in the seat width direction". The upper side terminals of the conductive cloth 31*b* in the both sides sandwiching the front and back faces of the lower covering material 37*c* are sutured to the lower covering material 37*c* by the suture portion 42*a*. In this manner, the conductive cloths 31*a* and 31*b* are attached to be turned over at the hanging groove 45*a* extending in the seat width direction and at the lower end portion of the seat back Sb2. Thus, the turnover portion 35*a* of the conductive cloth 31*a* and the turnover portion 35*b* of the conductive cloth 31*b* are difficult to be brought into contact with a seat occupant, and little tension in the seat width direction is applied thereto, and accordingly, it is possible to inhibit disconnection of leading wire in the conductive cloths 31*a* and 31*b*. Thus, the conductive cloths 31*a* and 31*b* are stably attached to the seat back Sb2.

By arranging the turnover portions 35*a* and 35*b* with avoiding the side face in the seat width direction of the vehicle seat Sb where a tensile load is significantly applied by a seat occupant leaning thereover, it is also possible to decrease a tensile load applied to the turnover portions 35*a* and 35*b*. In particular, since the turnover portions 35*a* and 35*b* are provided in the center side of the seat width direction excluding the bank portion 39, it is possible to decrease a tensile load applied to the turnover portions 35*a* and 35*b* to be extremely small, even when a seat occupant abuts the bank portion 39 due to a lateral jolting of a vehicle. In this manner, it is possible to stably maintain a condition of attachment of the conductive cloth 31*a* and the conductive cloth 31*b* to the seat back Sb2, and to inhibit disconnection of the leading wire inside the conductive cloths 31*a* and 31*b*, allowing stable detection of a cardiac electric potential of a seat occupant.

Although, in the above embodiment, a structure in which conductive cloths are arranged in a seat back has been explained, the present disclosure is not limited to such structure, but is also applicable to a structure in which a conductive cloth is arranged in a seat cushion. Although, in the above embodiment, conductive cloths have been explained, it is possible to use any metal conductive body having a suitable conductivity capable of conducting electricity to an electrode, and it is possible to use a conductive fiber sewed into the covering material. Number of the electrode, number of the hanging groove, number of the conductive cloth, etc. in the embodiments are arbitrary, depending on a seat shape.

Although the above embodiment is explained with taking a vibration device as an example which forms the wakefulness supporting device, the present disclosure is not limited to such structure. For example, it is also possible to use a display, a light, or a buzzer, or the like provided in a car to inform a seat occupant or a fellow passenger with an image, a light, or a sound, to directly or indirectly support wakefulness of the seat occupant.

TABLE OF REFERENCE NUMERALS

1: Pressure sensor (Detector)
2: ECU (Signal receiving portion)
3: Leading wire (First transmission path forming portion)
4: Cable (Second transmission path forming portion)
5: Terminal linking member (Fastening member)
6: Holder film
    6A: Sensor attachment portion
    6B: Middle portion (Second portion)
    6C: Expanded portion (First portion)
    6m: First extending portion
    6n: Second extending portion
7: Insulating tape
8: Rear-electrode unit (Second electrode unit)
    8a: Conductive sheet
    8b: Cut portion
    8d: Leading wire
    8e: Terminal linking member
    8f: Cable
9: Respiration sensor
10: Sensor unit
    10a: Heartbeat sensor
11: Upper electrode unit (Second electrode unit)
    11a: Conductive sheet
    11aa: Ink
    11ab: Second resin film
    11ac: First resin film
    11ad: Double-sided tape
    11b: Cut
    11c: Cut out portion
    11d: Leading wire
    11e: Terminal linking member
    11f: Cable
12: Warp restraining member
    12a: Outer surface
    12b: Flange portion
    12c: Recess portion
13: Fore-electrode unit (First electrode unit)
    13a: Conductive sheet
    13b: Cut portion
    13c: Cut out portion
    13d: Leading wire
    13e: Terminal linking member
    13f: Cable
14: Respiration sensor
    14a: Fore-portion
    14b: Middle portion
    14c: Rear-portion
15: Heartbeat sensor
16: Rear-electrode unit (Second electrode unit)
    16b: Cut portion
    16c: Cut out portion
    16d: Projecting portion (Protruding portion)
17: Fore-electrode unit (First electrode unit)
    17b: Cut portion
    17c: Cut out portion
18: Heartbeat sensor
19a: Upper electrode unit
19b: Lower electrode unit
19f: Cable
20: Through hole
    20a: Gradient face
21: Detection device
22: Numerical processing device
23: Vibration device
31a, 31b, 31e: Conductive cloth
35a, 35b: Turnover portion
37a: Upper covering material
37b: Middle covering material
37c: Lower covering material
38a: Upper pad
38b: Middle pad
38c: Lower pad
39: Bank portion
40a: Covering
40b: Wadding
42a, 42b: Suture portion
43: Wire
44: Hook (Hanging portion)
45a: Hanging groove

TABLE OF REFERENCE NUMERALS

C1: Administrative chair (Seat with detector)
P: Pad member
    P1: Cushion pad
    P2: Cushion pad
    Pa: Hanging groove
S: Present seat (Seat with detector)
    S1: Seat cushion
    S2: Seat back
    S3: Headrest
    Sa: Vehicle seat
    Sa1, Sa3: Seat cushion
    Sa1a: upper surface portion
    Sa1b: vertical surface portion
    Sa1c: corner portion
    Sa2: Seat back
    Sb: Vehicle seat
    Sb1: Seat cushion
    Sb2: Seat back
    Su1, Su2: Covering material (Seat covering)
131: first portion of sensor
132: second portion of sensor
133: third portion of sensor
51: first cushion region, second bulge portion
52: second cushion region, second bulge portion
53: central cushion region
55: partition portion
61: first back region, first bulge portion
62: second back region, first bulge portion
63: central back region
T: Adhesive tape
U: Wakefulness supporting device

What is claimed is:

1. A seat, comprising:
a seat cushion configured as a seating portion for a seated occupant, the seat cushion including an upper surface portion and a vertical surface portion; and
a biological sensor configured to detect a biological signal of the seated occupant,
wherein the biological sensor comprises a first portion that is arranged on the vertical surface portion of the seat cushion, a second portion that is arranged on a corner portion between the upper surface portion and the vertical surface portion of the seat cushion, and a third portion that is arranged on the upper surface portion of the seat cushion, and a width of the third portion of the biological sensor in a seat width direction is larger than a width of the first portion of the biological sensor in the seat width direction, and
the first portion, the second portion, and the third portion of the biological sensor are integral portions of a one-piece member that continuously extends from the vertical surface portion to the upper surface portion of the seat cushion.

2. The seat according to claim 1, wherein the biological sensor comprises a pair of sensor elements that are arranged on the seat cushion, the pair of sensor elements being separated from one another in a seat width direction.

3. The seat according to claim 1 further comprising a pressure sensor that is arranged on the upper surface portion of the seat cushion,
wherein the first portion of the biological sensor does not overlap with the pressure sensor in a seat front to back direction.

4. The seat according to claim 1, wherein the biological sensor is a capacitance sensor and the seat further comprises a pressure sensor that is arranged on the upper surface portion of the seat cushion,
wherein the biological sensor is located at a different position on the upper surface portion than the pressure sensor.

5. The seat according to claim 1, wherein:
the seat cushion includes a partition portion that partitions a front portion and a rear portion of the upper surface portion, and
the biological sensor is arranged in front of the partition portion.

6. The seat according to claim 5 further comprising a pressure sensor that is arranged on the upper surface portion of the seat cushion,
wherein the pressure sensor is arranged at a rear of the partition portion.

7. A seat, comprising:
a seat cushion configured as a seating portion for a seated occupant, the seat cushion including an upper surface portion and a vertical surface portion;
a pressure sensor arranged on the upper surface portion of the seat cushion; and
a biological sensor configured to detect a biological signal of the seated occupant,
wherein the biological sensor comprises a capacitance sensor and is located at a different position on the upper surface portion than the pressure sensor, and the biological sensor comprises a first portion that is arranged on the vertical surface portion of the seat cushion.

8. The seat according to claim 7, wherein the biological sensor comprises a pair of sensor elements that are arranged on the seat cushion, the pair of sensor elements being separated from one another in a seat width direction.

9. The seat according to claim 7, wherein the biological sensor further comprises a second portion that is arranged on a corner portion between the upper surface portion and the vertical surface portion of the seat cushion.

10. The seat according to claim 9, wherein:
the biological sensor further comprises a third portion that is arranged on the upper surface portion of the seat cushion, and
the first portion, the second portion, and the third portion of the biological sensor are integral portions of a one-piece member that continuously extends from the vertical surface portion to the upper surface portion of the seat cushion.

11. The seat according to claim 7, wherein the first portion of the biological sensor does not overlap with the pressure sensor in a seat front to back direction.

12. The seat according to claim 7, wherein:
the seat cushion includes a partition portion that partitions a front portion and a rear portion of the upper surface portion, and
the biological sensor is arranged in front of the partition portion.

13. The seat according to claim 12, wherein the pressure sensor is arranged at a rear of the partition portion.

14. A seat, comprising:
a seat cushion configured as a seating portion for a seated occupant, the seat cushion including an upper surface portion, a vertical surface portion, and a partition portion that partitions a front portion and a rear portion of the upper surface portion;
a pressure sensor that is arranged on the upper surface portion of the seat cushion, and is arranged at a rear of the partition portion; and
a biological sensor configured to detect a biological signal of the seated occupant, wherein the biological sensor is arranged in front of the partition portion, and the biological sensor comprises a first portion that is arranged on the vertical surface portion of the seat cushion.

15. The seat according to claim 14, wherein the biological sensor comprises a pair of sensor elements that are arranged on the seat cushion, the pair of sensor elements being separated from one another in a seat width direction.

16. The seat according to claim 14, wherein the biological sensor further comprises a second portion that is arranged on a corner portion between the upper surface portion and the vertical surface portion of the seat cushion.

17. The seat according to claim 16, wherein:
the biological sensor further comprises a third portion that is arranged on the upper surface portion of the seat cushion, and
the first portion, the second portion, and the third portion of the biological sensor are integral portions of a one-piece member that continuously extends from the vertical surface portion to the upper surface portion of the seat cushion.

18. The seat according to claim 14, wherein the first portion of the biological sensor does not overlap with the pressure sensor in a seat front to back direction.

* * * * *